United States Patent
Liao et al.

(10) Patent No.: US 9,030,760 B2
(45) Date of Patent: May 12, 2015

(54) IMAGING LENS ASSEMBLY

(71) Applicant: Largan Precision Co., Ltd., Taichung (TW)

(72) Inventors: Lin-Yao Liao, Taichung (TW); Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 96 days.

(21) Appl. No.: 13/849,555

(22) Filed: Mar. 25, 2013

(65) Prior Publication Data

US 2014/0254031 A1    Sep. 11, 2014

(30) Foreign Application Priority Data

Mar. 11, 2013    (TW) .............................. 102108484 A

(51) Int. Cl.
G02B 13/00 (2006.01)
G02B 9/34 (2006.01)

(52) U.S. Cl.
CPC ................ *G02B 13/004* (2013.01); *G02B 9/34* (2013.01)

(58) Field of Classification Search
CPC ................................ G02B 13/004; G02B 9/34
USPC .......................................... 359/715, 771–773
See application file for complete search history.

(56) References Cited

U.S. PATENT DOCUMENTS

| | | | |
|---|---|---|---|
| 7,215,492 B2 | 5/2007 | Sato et al. | |
| 7,535,659 B2 | 5/2009 | Sano | |
| 7,777,972 B1 * | 8/2010 | Chen et al. | 359/773 |
| 8,081,393 B2 | 12/2011 | Chen et al. | |
| 8,169,528 B2 | 5/2012 | Chen et al. | |
| 2009/0207506 A1 * | 8/2009 | Tang et al. | 359/773 |
| 2010/0134904 A1 * | 6/2010 | Tsai | 359/764 |
| 2012/0062782 A1 * | 3/2012 | Huang | 348/340 |
| 2013/0335588 A1 * | 12/2013 | Matsusaka et al. | 348/220.1 |

FOREIGN PATENT DOCUMENTS

| | | |
|---|---|---|
| CN | 202177732 U | 3/2012 |
| JP | 2006-293324 A | 10/2006 |
| JP | 2008-046526 A | 2/2008 |
| TW | 200937065 A | 9/2009 |
| TW | 201217851 A | 5/2012 |
| TW | 201245797 A | 11/2012 |

* cited by examiner

*Primary Examiner* — Jordan Schwartz
(74) *Attorney, Agent, or Firm* — CKC & Partners Co., Ltd.

(57) ABSTRACT

An imaging lens assembly includes, in order from an object side to an image side, a first lens element, a second lens element, a third lens element and a fourth lens element. The positive first lens element has a convex object-side surface at a paraxial region. The negative second lens element has a concave image-side surface at a paraxial region, wherein the image-side surface thereof has a convex shape at a peripheral region, and the surfaces thereof are aspheric. The positive third lens element has a convex object-side surface at a paraxial region and a convex image-side surface at a paraxial region. The negative fourth lens element has a concave image-side surface at a paraxial region, wherein the image-side surface thereof has a convex shape at a peripheral region, and the surfaces thereof are aspheric. The imaging lens assembly has a total of four lens elements with refractive power.

18 Claims, 17 Drawing Sheets

IMAGING LENS ASSEMBLY

RELATED APPLICATIONS

The application claims priority to Taiwan Application Serial Number 102108484, filed Mar. 11, 2013, which is herein incorporated by reference.

BACKGROUND

1. Technical Field

The present disclosure relates to an imaging lens assembly. More particularly, the present disclosure relates to a compact imaging lens assembly applicable to electronic products.

2. Description of Related Art

In recent years, with the popularity of mobile products with camera functionalities, the demand for a miniaturized optical system has been increasing. The sensor of a conventional photographing camera is typically a CCD (Charge Coupled Device) or a CMOS (Complementary Metal-Oxide Semiconductor Sensor). As the advanced semiconductor manufacturing technologies have allowed the pixel size of sensors to be reduced and compact optical systems have gradually evolved toward the field of higher megapixels, there is an increasing demand for optical systems featuring better image quality.

A conventional optical system applied in a portable electronic product typically adopts a three-element lens structure, such as the one disclosed in the U.S. Pat. No. 8,081,393. Due to the popularity of mobile products with high-end specifications, such as smart phones and PDAs (Personal Digital Assistants), the requirements for high resolution and image quality of modern compact optical systems has been increasing significantly. However, the conventional three-element lens structure cannot satisfy these requirements of the compact optical system.

Although other conventional optical systems with four-element lens structure such as the one disclosed in the U.S. Pat. No. 8,169,528. This four-element lens structure cannot effectively balance the refractive power of the third and the fourth lens elements with the refractive power of the first and the second lens elements. Therefore, the front lens elements, especially the first lens element, tend to result in more system sensitivity. Moreover, the surface shape of the third lens element is not favorable for reducing the sensitivity for the optical system. Therefore, the manufacturing yield rate of this optical system tends to be low.

SUMMARY

According to one aspect of the present disclosure, an imaging lens assembly includes, in order from an object side to an image side, a first lens element, a second lens element, a third lens element and a fourth lens element. The first lens element with positive refractive power has a convex object-side surface at a paraxial region thereof. The second lens element with negative refractive power has a concave image-side surface at a paraxial region thereof, wherein the image-side surface of the second lens element has a convex shape at a peripheral region thereof, and both of an object-side surface and the image-side surface of the second lens element are aspheric. The third lens element with positive refractive power has a convex object-side surface at a paraxial region thereof and a convex image-side surface at a paraxial region thereof. The fourth lens element with negative refractive power has a concave image-side surface at a paraxial region thereof, wherein the image-side surface of the fourth lens element has a convex shape at a peripheral region thereof, and both of an object-side surface and the image-side surface of the fourth lens element are aspheric. The imaging lens assembly has a total of four lens elements with refractive power. When an axial distance between the first lens element and the second lens element is T12, an axial distance between the second lens element and the third lens element is T23, an axial distance between the third lens element and the fourth lens element is T34, a curvature radius of the object-side surface of the second lens element is R3, a curvature radius of the image-side surface of the second lens element is R4, a focal length of the imaging lens assembly is f, a focal length of the third lens element is f3, and a focal length of the fourth lens element is f4, the following relationships are satisfied:

$0 < (T23+T34)/T12 < 2.0;$ $0 < R4/|R3| < 0.9;$ and $4.0 < f/f3 + |f/f4| < 9.0.$

DETAILED DESCRIPTION

Figure 1:
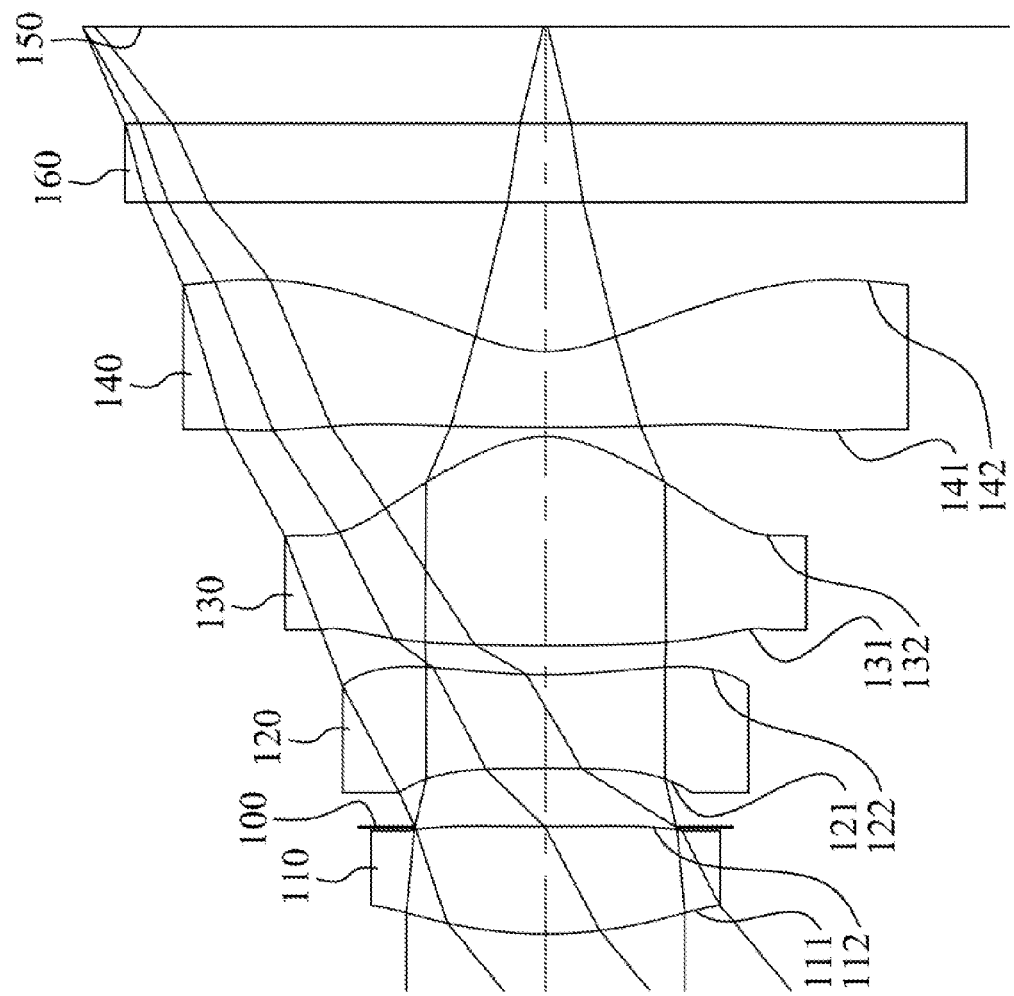
FIG. 1 is a schematic view of an imaging lens assembly according to the 1st embodiment of the present disclosure.

An imaging lens assembly includes, in order from an object side to an image side, a first lens element, a second lens element, a third lens element and a fourth lens element. The imaging lens assembly has a total of four lens elements with refractive power.

The first lens element with positive refractive power has a convex object-side surface at a paraxial region thereof, and can have a concave image-side surface at a paraxial region thereof, wherein the image-side surface of the first lens element can have a convex shape at a peripheral region thereof. Therefore, it is favorable for reducing the total track length of the imaging lens assembly and the astigmatism so as to correct the aberration of the off-axis by properly adjusting the positive refractive power of the first lens element.

The second lens element with negative refractive power has a concave image-side surface at a paraxial region thereof, wherein the image-side surface of the second lens element has a convex shape at a peripheral region thereof. Therefore, it is favorable for correcting the aberration generated from the first lens element and effectively reducing the angle at which the incident light projects onto an image sensor from the off-axis so as to improve the responding efficiency of the image sensor.

The third lens element with positive refractive power has a convex object-side surface at a paraxial region thereof and a convex image-side surface at a paraxial region thereof, wherein the image-side surface of the third lens element can have a concave shape at a peripheral region thereof. Therefore, it is favorable for effectively reducing the sensitivity and avoiding overloading the positive refractive power on one single lens element resulting in excessive spherical aberrations so as to further correct the aberration of the off-axis.

The fourth lens element with negative refractive power can have a concave object-side surface at a paraxial region thereof and has a concave image-side surface at a paraxial region thereof, wherein the image-side surface of the fourth lens element has a convex shape at a peripheral region thereof. Therefore, the principal point can be effectively positioned away from the image plane for further reducing the back focal length so as to reduce the total track length for keeping the imaging lens assembly compact. It is also favorable for effectively correcting the astigmatism and reducing the angle at which the incident light projects onto the image sensor from the off-axis so as to improve the responding efficiency of the image sensor.

When an axial distance between the first lens element and the second lens element is T12, an axial distance between the second lens element and the third lens element is T23, and an axial distance between the third lens element and the fourth lens element is T34, the following relationship is satisfied: $0<(T23+T34)/T12<2.0$. Therefore, it is favorable for assembling the lens elements so as to improve the manufacturing yield rate. Preferably, the following relationship is satisfied: $0.5<(T23+T34)/T12<1.3$.

When a curvature radius of the object-side surface of the second lens element is R3, and a curvature radius of the image-side surface of the second lens element is R4, the following relationship is satisfied: $0<R4/|R3|<0.9$. Therefore the astigmatism of the imaging lens assembly can be corrected. Preferably, the following relationship is satisfied: $0<R4/|R3|<0.6$.

When a focal length of the imaging lens assembly is f, a focal length of the third lens element is f3, and a focal length of the fourth lens element is f4, the following relationship is satisfied: $4.0<f/f3+|f/f4|<9.0$. Therefore, the imaging lens assembly can balance the refractive power of the first lens element and the second lens element with the refractive power of the third lens element and the fourth lens element to reduce the sensitivity of the front lens elements, in particular the first lens element, so as to increase the manufacturing yield rate. Preferably, the following relationship is satisfied: $4.5<f/f3+|f/f4|<8.5$. More preferably, the following relationship is satisfied: $5.0<f/f3+|f/f4|<8.0$.

When a curvature radius of the object-side surface of the third lens element is R5, and a curvature radius of the image-side surface of the third lens element is R6, the following relationship is satisfied: $0.5<(R5+R6)/(R5-R6)\leq 1.0$. Therefore, it is favorable for reducing the spherical aberration and the photosensitivity of the imaging lens assembly.

When a curvature radius of the object-side surface of the fourth lens element is R7, and a curvature radius of the image-side surface of the fourth lens element is R8, the following relationship is satisfied: $0\leq R8/|R7|<0.6$. Therefore, it is favorable for reducing the back focal length of the imaging lens assembly so as to keep the imaging lens assembly compact.

When the focal length of the third lens element is f3, and the focal length of the fourth lens element is f4, the following relationship is satisfied: $0.75<|f3/f4|<1.25$. Therefore it is favorable for balancing the arrangement of the refractive power for reducing the sensitivity of the imaging lens assembly so as to increase the manufacturing yield rate.

When the curvature radius of the image-side surface of the second lens element is R4, and a curvature radius of the object-side surface of the third lens element is R5, the following relationship is satisfied: $0<R4/R5$. Therefore, it is favorable for correcting the aberration and reducing the spherical aberration.

When a focal length of the first lens element is f1, and a focal length of the second lens element is f2, the following relationship is satisfied: $0.5<|f1/f2|<1.5$. Therefore, it is favorable for effectively reducing the total track length and the aberration.

When the axial distance between the first lens element and the second lens element is T12, and a central thickness of the second lens element is CT2, the following relationship is satisfied: $0.30<T12/CT2<0.80$. Therefore, it provides favorable moldability and homogeneity for lens elements which is thereby favorable for increasing the manufacturing yield rate.

When a distance in parallel with an optical axis from an axial vertex on the image-side surface of the second lens element to a maximum effective diameter position on the image-side surface of the second lens element is Sag22, and the axial distance between the second lens element and the third lens element is T23, the following relationship is satisfied: $-1.0<Sag22/T23<0.2$. Therefore, it is favorable for manufacturing and molding the lens elements and also assembling the lens elements of the imaging lens assembly so as to increase the manufacturing yield rate.

When the curvature radius of the image-side surface of the third lens element is R6, and a central thickness of the third lens element is CT3, the following relationship is satisfied: $-0.85<R6/CT3<|0.25$. Therefore, it is favorable for manufacturing and molding the lens elements so as to reduce the sensitivity of the imaging lens assembly.

When an Abbe number of the second lens element is V2, and an Abbe number of the fourth lens element is V4, the following relationship is satisfied: $1.5<V4/V2<3.0$. Therefore, it is favorable for correcting the chromatic aberration of the imaging lens assembly.

When the axial distance between the first lens element and the second lens element is T12, the axial distance between the second lens element and the third lens element is T23, the axial distance between the third lens element and the fourth lens element is T34, and an axial distance between the object-side surface of the first lens element and the image-side surface of the fourth lens element is Td, the following relationship is satisfied: 0.10<(T12+T23+T34)/Td<0.22. Therefore, it is favorable for assembling the lens elements so as to keep the imaging lens assembly compact According to the imaging lens assembly of the present disclosure, the lens elements thereof can be made of plastic or glass material. When the lens elements are made of plastic material, the manufacturing cost can be effectively reduced. When the lens elements are made of glass material, the freedom for distributing the refractive power of the imaging lens assembly can be increased. Furthermore, the surface of each lens element can be aspheric, so that it is easier to make the surface into non-spherical shapes. As a result, more controllable variables are obtained, and the aberration is reduced, and the number of required lens elements can be reduced while constructing the imaging lens assembly. Therefore, the total track length of the imaging lens assembly can also be reduced.

According to the imaging lens assembly of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when the lens element has a convex surface, it indicates that the surface is convex at the paraxial region; and when the lens element has a concave surface, it indicates that the surface is concave at the paraxial region.

According to the imaging lens assembly of the present disclosure, there can be at least one stop provided, such as an aperture stop, a glare stop or a field stop. Said glare stop or a field stop is for eliminating the stray light and thereby improving the image quality thereof.

According to the imaging lens assembly of the present disclosure, an aperture stop can be configured as a front stop or a middle stop. A front stop which can be disposed between an imaged object and the first lens element can provide a longer distance between an exit pupil of the imaging lens assembly and an image plane and which improves the responding efficiency of the image sensor. A middle stop which can be disposed between the first lens element and the image plane is favorable for enlarging the field of view of the imaging lens assembly and thereby provides a wider field of view for the same.

According to the imaging lens assembly of the present disclosure, the imaging lens assembly is featured with good correction ability and high image quality, and can be applied to 3D (three-dimensional) image capturing applications, in products such as digital cameras, mobile devices and tablets.

According to the above description of the present disclosure, the following 1st-8th specific embodiments are provided for further explanation.

1st Embodiment

Figure 2:
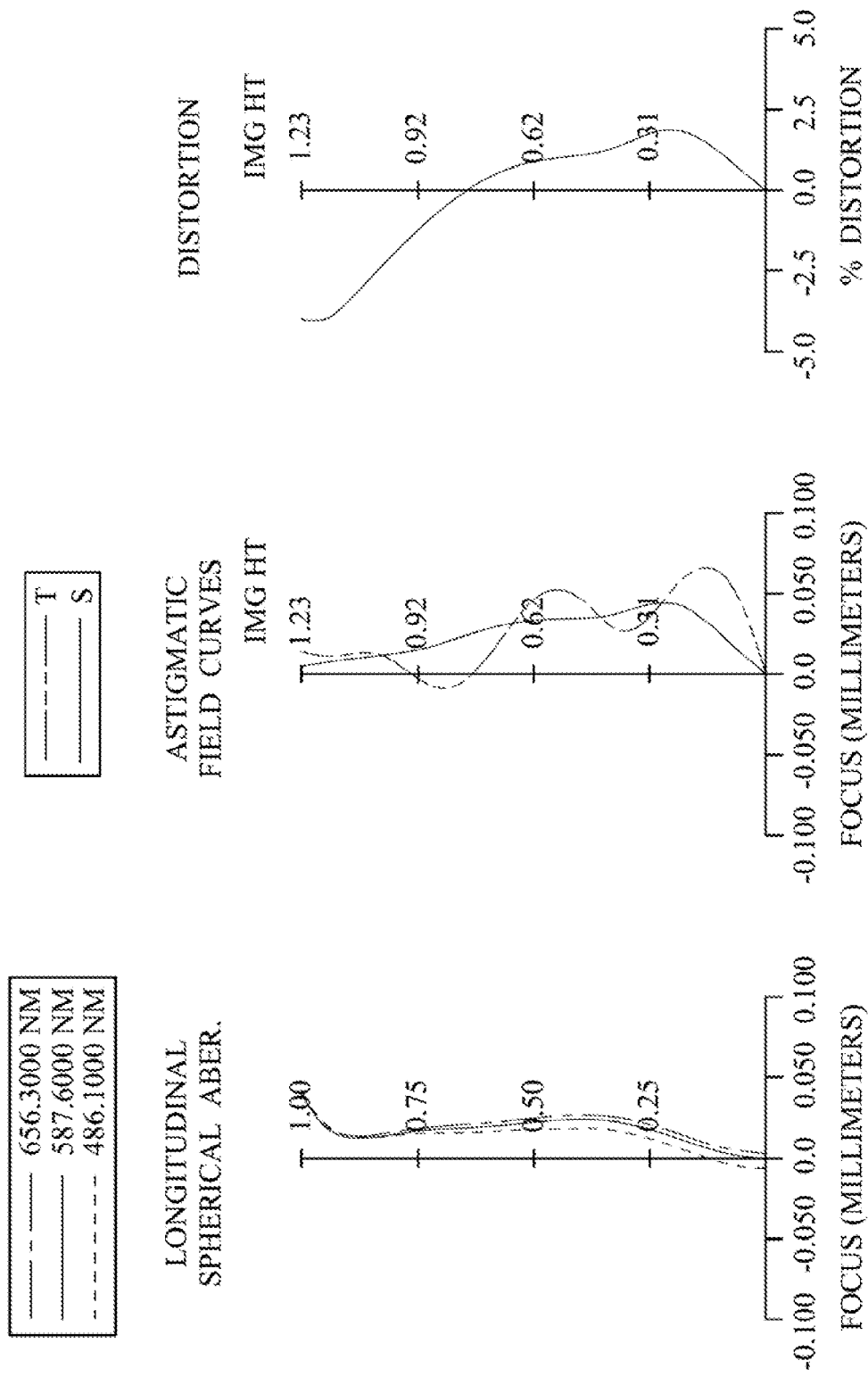
FIG. 2 shows spherical aberration curves, astigmatic field curves and a distortion curve of the imaging lens assembly according to the 1st embodiment.

FIG. 1 is a schematic view of an imaging lens assembly according to the 1st embodiment of the present disclosure. FIG. 2 shows spherical aberration curves, astigmatic field curves and a distortion curve of the imaging lens assembly according to the 1st embodiment. In FIG. 1, the imaging lens assembly includes, in order from an object side to an image side, a first lens element 110, an aperture stop 100, a second lens element 120, a third lens element 130, a fourth lens element 140, an IR-cut filter 160 and an image plane 150. The imaging lens assembly has a total of four lens elements with refractive power.

The first lens element 110 is made of plastic material. The first lens element 110 with positive refractive power has a convex object-side surface 111 at a paraxial region thereof and a concave image-side surface 112 at a paraxial region thereof, wherein the image-side surface 112 of the first lens element 110 has a convex shape at a peripheral region thereof. The object-side surface 111 and the image-side surface 112 of the first lens element 110 are aspheric.

The second lens element 120 is made of plastic material. The second lens element 120 with negative refractive power has a concave object-side surface 121 at a paraxial region thereof and a concave image-side surface 122 at a paraxial region thereof, wherein the image-side surface 122 of the second lens element 120 has a convex shape at a peripheral region thereof. The object-side surface 121 and the image-side surface 122 of the second lens element 120 are aspheric.

The third lens element 130 is made of plastic material. The third lens element 130 with positive refractive power has a convex object-side surface 131 at a paraxial region thereof and a convex image-side surface 132 at a paraxial region thereof, wherein the image-side surface 132 of the third lens element 130 has a concave shape at a peripheral region thereof. The object-side surface 131 and the image-side surface 132 of the third lens element 130 are aspheric.

The fourth lens element 140 is made of plastic material. The fourth lens element 140 with negative refractive power has a concave object-side surface 141 at a paraxial region thereof and a concave image-side surface 142 at a paraxial region thereof, wherein the image-side surface 142 of the fourth lens element 140 has a convex shape at a peripheral region thereof. The object-side surface 141 and the image-side surface 142 of the fourth lens element 140 are aspheric.

The IR-cut filter 160 is made of glass and located between the fourth lens element 140 and the image plane 150, and will not affect the focal length of the imaging lens assembly.

The equation of the aspheric surface profiles of the aforementioned lens elements of the first embodiment is expressed as follows:

$$X(Y) = (Y^2/R)/(1 + sqrt(1 - (1+k) \times (Y/R)^2)) + \sum_i (Ai) \times (Y^i)$$

wherein,

X is the relative distance between a point on the aspheric surface at a distance Y from the optical axis and the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the imaging lens assembly according to the 1st embodiment, when a focal length of the imaging lens assembly is f, an f-number of the imaging lens assembly is Fno, and half of the maximal field of view of the imaging lens assembly is HFOV, these parameters have the following values: f=1.52 mm; Fno=2.04; and HFOV=40.0 degrees.

In the imaging lens assembly according to the 1st embodiment, when an Abbe number of the second lens element 120 is V2, and an Abbe number of the fourth lens element 140 is V4, the following relationship is satisfied: V4/V2=2.40.

In the imaging lens assembly according to the 1st embodiment, when an axial distance between the first lens element 110 and the second lens element 120 is T12, and a central thickness of the second lens element 120 is CT2, the following relationship is satisfied: T12/CT2=0.62.

In the imaging lens assembly according to the 1st embodiment, when the axial distance between the first lens element 110 and the second lens element 120 is T12, an axial distance between the second lens element 120 and the third lens element 130 is T23, and an axial distance between the third lens element 130 and the fourth lens element 140 is T34, the following relationship is satisfied: (T23+T34)/T12=0.66.

Figure 17:
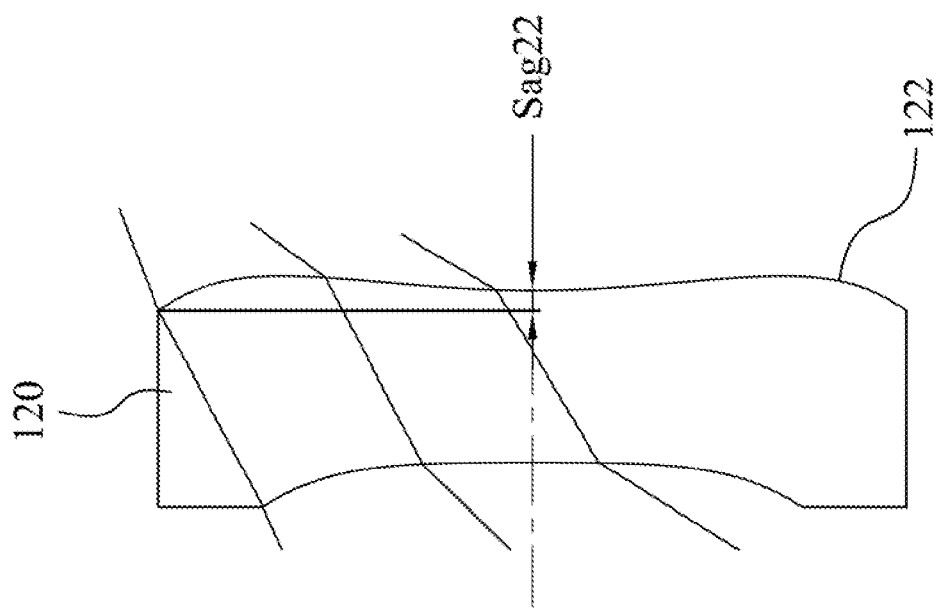
FIG. 17 shows Sag22 of the second lens element according to the imaging lens assembly of FIG. 1.

FIG. 17 shows Sag22 of the second lens element 120 of the imaging lens assembly according to FIG. 1. In FIG. 17, when a distance in parallel with an optical axis from an axial vertex on the image-side surface 122 of the second lens element 120 to a maximum effective diameter position on the image-side surface 122 of the second lens element 120 is Sag22 (When the distance towards the object side of the imaging lens assembly is negative, and when the distance towards the image side of the imaging lens assembly is positive.), and the axial distance between the second lens element 120 and the third lens element 130 is T23, the following relationship is satisfied:

$Sag22/T23=-0.38$.

In the imaging lens assembly according to the 1st embodiment, when a curvature radius of the image-side surface 132 of the third lens element 130 is R6, and a central thickness of the third lens element 130 is CT3, the following relationship is satisfied: R6/CT3=−0.51.

In the imaging lens assembly according to the 1st embodiment, when the axial distance between the first lens element 110 and the second lens element 120 is T12, the axial distance between the second lens element 120 and the third lens element 130 is T23, the axial distance between the third lens element 130 and the fourth lens element 140 is T34, and an axial distance between the object-side surface 111 of the first lens element 110 and the image-side surface 142 of the fourth lens element 140 is Td, the following relationship is satisfied: (T12+T23+T34)/Td=0.17.

In the imaging lens assembly according to the 1st embodiment, when a curvature radius of the object-side surface 121 of the second lens element 120 is R3, a curvature radius of the image-side surface 122 of the second lens element 120 is R4, a curvature radius of the object-side surface 131 of the third lens element 130 is R5, the curvature radius of the image-side surface 132 of the third lens element 130 is R6, a curvature radius of the object-side surface 141 of the fourth lens element 140 is R7, and a curvature radius of the image-side surface 142 of the fourth lens element 140 is R8, the following relationships are satisfied: R4/|R3|=0.14; R4/R5=0.24; (R5+R6)/(R5−R6)=0.92; and R8/|R7|=0.0031.

In the imaging lens assembly according to the 1st embodiment, when the focal length of the imaging lens assembly is f, a focal length of the first lens element 110 is f1, a focal length of the second lens element 120 is f2, a focal length of the third lens element 130 is f3, and a focal length of the fourth lens element 140 is f4, the following relationships are satisfied: |f1/f2|=1.14; |f3/f4|=0.90; f/f3+|f/f4|=5.61.

The detailed optical data of the 1st embodiment are shown in Table 1 and the aspheric surface data are shown in Table 2 below.

TABLE 1

1st Embodiment
f = 1.52 mm, Fno = 2.04, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.184 | ASP | 0.288 | Plastic | 1.544 | 55.9 | 2.44 |
| 2 | | 10.152 | ASP | −0.002 | | | | |
| 3 | Ape. Stop | Plano | | 0.157 | | | | |
| 4 | Lens 2 | −11.472 | ASP | 0.250 | Plastic | 1.640 | 23.3 | −2.14 |
| 5 | | 1.565 | ASP | 0.078 | | | | |
| 6 | Lens 3 | 6.425 | ASP | 0.557 | Plastic | 1.544 | 55.9 | 0.51 |
| 7 | | −0.282 | ASP | 0.025 | | | | |
| 8 | Lens 4 | −100.000 | ASP | 0.200 | Plastic | 1.544 | 55.9 | −0.57 |
| 9 | | 0.312 | ASP | 0.400 | | | | |
| 10 | IR-cut filter | Plano | | 0.210 | Glass | 1.517 | 64.2 | — |
| 11 | | Plano | | 0.259 | | | | |
| 12 | Image | Plano | | — | | | | |

Note:
Reference wavelength (d-line) is 587.6 nm.

TABLE 2

Aspheric Coefficients

| | Surface # | | | |
|---|---|---|---|---|
| | 1 | 2 | 4 | 5 |
| k = | 6.4773E−01 | −9.0000E+01 | −9.0000E+01 | −1.0000E+00 |
| A4 = | −3.2875E−02 | −7.9906E−01 | −2.1020E+00 | −1.6815E+00 |
| A6 = | −1.8558E+00 | −4.4666E+00 | 4.5787E−01 | 8.7304E+00 |
| A8 = | −4.2115E+00 | 1.3712E+00 | −6.3990E+01 | −5.6297E+01 |
| A10 = | 1.4713E+02 | −2.0723E+03 | 4.2035E+02 | 1.4552E+02 |
| A12 = | −9.7069E+02 | 1.2653E+04 | −8.8575E+02 | −1.5550E+02 |
| A14 = | 1.6649E+03 | −2.7257E+04 | | |

TABLE 2-continued

Aspheric Coefficients

| Surface # | 6 | 7 | 8 | 9 |
|---|---|---|---|---|
| k = | −8.9668E+01 | −4.3805E+00 | −9.0000E+01 | −5.9507E+00 |
| A4 = | −8.2759E−01 | −3.3115E+00 | 1.3109E+00 | −2.5903E−01 |
| A6 = | 1.8574E+01 | 3.3155E+01 | −1.0725E+01 | −4.5847E−01 |
| A8 = | −1.5270E+02 | −2.1791E+02 | 3.8645E+01 | 1.5524E+00 |
| A10 = | 8.0328E+02 | 8.7619E+02 | −8.0428E+01 | −1.7359E+00 |
| A12 = | −2.6703E+03 | −1.8855E+03 | 9.9814E+01 | 2.4107E−01 |
| A14 = | 4.9597E+03 | 2.0112E+03 | −6.7518E+01 | 8.9923E−01 |
| A16 = | −3.9400E+03 | −8.4189E+02 | 1.8901E+01 | −4.5315E−01 | in Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and thus an explanation in this regard will not be provided again.

2nd Embodiment

Figure 3:
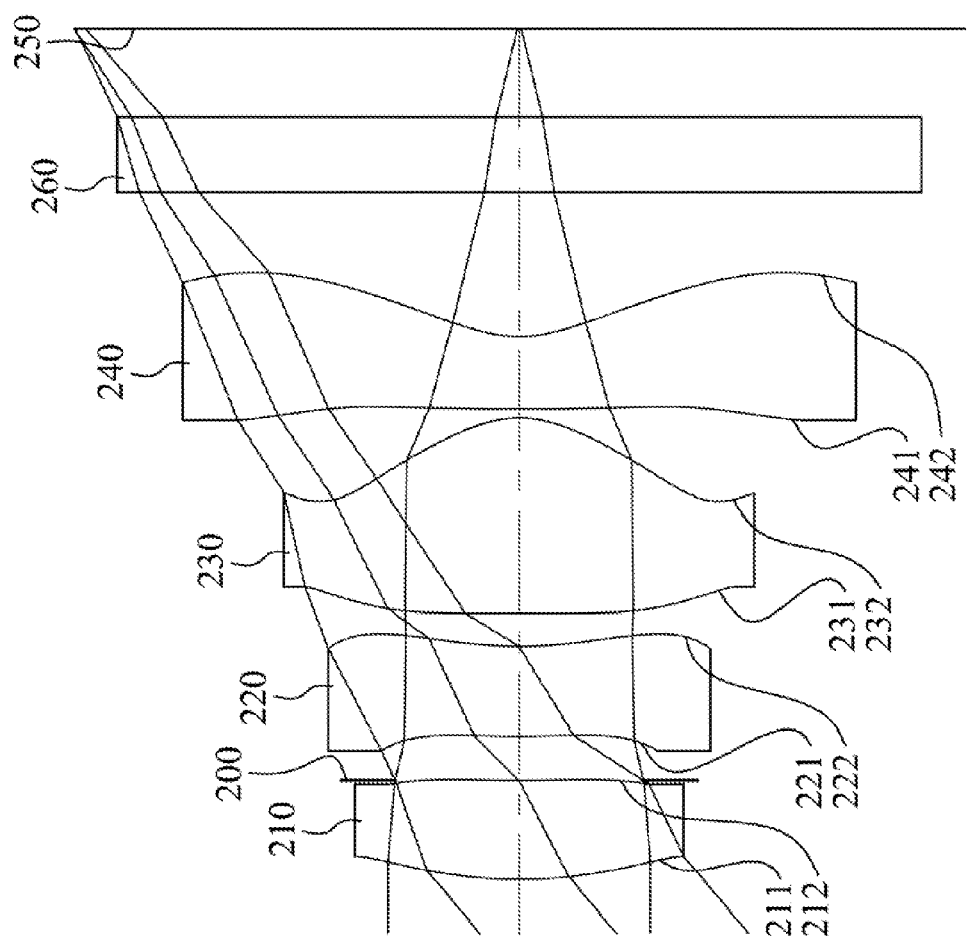
FIG. 3 is a schematic view of an imaging lens assembly according to the 2nd embodiment of the present disclosure.
Figure 4:
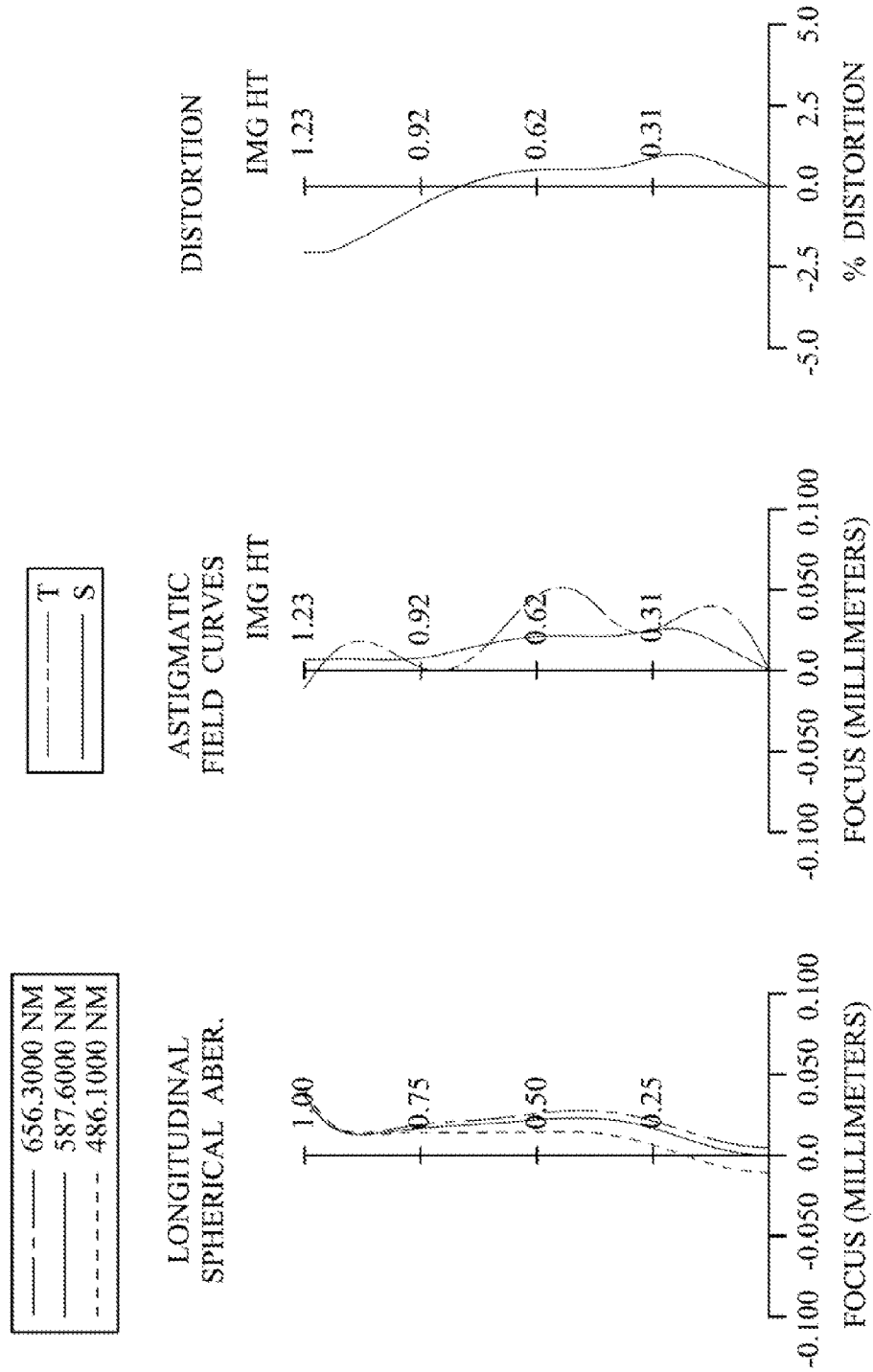
FIG. 4 shows spherical aberration curves, astigmatic field curves and a distortion curve of the imaging lens assembly according to the 2nd embodiment.

FIG. 3 is a schematic view of an imaging lens assembly according to the 2nd embodiment of the present disclosure. FIG. 4 shows spherical aberration curves, astigmatic field curves and a distortion curve of the imaging lens assembly according to the 2nd embodiment. In FIG. 3, the imaging lens assembly includes, in order from an object side to an image side, a first lens element 210, an aperture stop 200, a second lens element 220, a third lens element 230, a fourth lens element 240, an IR-cut filter 260 and an image plane 250. The imaging lens assembly has a total of four lens elements with refractive power.

The first lens element 210 is made of plastic material. The first lens element 210 with positive refractive power has a convex object-side surface 211 at a paraxial region thereof and a concave image-side surface 212 at a paraxial region thereof, wherein the image-side surface 212 of the first lens element 210 has a convex shape at a peripheral region thereof.

The object-side surface 211 and the image-side surface 212 of the first lens element 210 are aspheric.

The second lens element 220 is made of plastic material. The second lens element 220 with negative refractive power has a convex object-side surface 221 at a paraxial region thereof and a concave image-side surface 222 at a paraxial region thereof, wherein the image-side surface 222 of the second lens element 220 has a convex shape at a peripheral region thereof. The object-side surface 221 and the image-side surface 222 of the second lens element 220 are aspheric.

The third lens element 230 is made of plastic material. The third lens element 230 with positive refractive power has a convex object-side surface 231 at a paraxial region thereof and a convex image-side surface 232 at a paraxial region thereof, wherein the image-side surface 232 of the third lens element 230 has a concave shape at a peripheral region thereof. The object-side surface 231 and the image-side surface 232 of the third lens element 230 are aspheric.

The fourth lens element 240 is made of plastic material. The fourth lens element 240 with negative refractive power has a concave object-side surface 241 at a paraxial region thereof and a concave image-side surface 242 at a paraxial region thereof, wherein the image-side surface 242 of the fourth lens element 240 has a convex shape at a peripheral region thereof. The object-side surface 241 and the image-side surface 242 of the fourth lens element 240 are aspheric.

The IR-cut filter 260 is made of glass and located between the fourth lens element 240 and the image plane 250, and will not affect the focal length of the imaging lens assembly.

The detailed optical data of the 2nd embodiment are shown in Table 3 and the aspheric surface data are shown in Table 4 below.

TABLE 3

2nd Embodiment
f = 1.49 mm, Fno = 2.04, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.276 | ASP | 0.276 | Plastic | 1.544 | 55.9 | 3.01 |
| 2 | | 5.339 | ASP | −0.001 | | | | |
| 3 | Ape. Stop | Plano | | 0.123 | | | | |
| 4 | Lens 2 | 2.791 | ASP | 0.250 | Plastic | 1.640 | 23.3 | −3.50 |
| 5 | | 1.199 | ASP | 0.090 | | | | |
| 6 | Lens 3 | 100.000 | ASP | 0.544 | Plastic | 1.544 | 55.9 | 0.53 |
| 7 | | −0.286 | ASP | 0.025 | | | | |
| 8 | Lens 4 | −100.000 | ASP | 0.200 | Plastic | 1.544 | 55.9 | −0.59 |
| 9 | | 0.324 | ASP | 0.400 | | | | |
| 10 | IR-cut filter | Plano | | 0.210 | Glass | 1.517 | 64.2 | — |
| 11 | | Plano | | 0.245 | | | | |
| 12 | Image | Plano | | — | | | | |

Note:
Reference wavelength (d-line) is 587.6 nm.

TABLE 4

Aspheric Coefficients

| Surface # | 1 | 2 | 4 | 5 |
|---|---|---|---|---|
| k = | 5.2997E−01 | −5.1976E+01 | −9.0000E+01 | −1.0000E+00 |
| A4 = | −4.3912E−02 | −1.1358E+00 | −2.1003E+00 | −1.2183E+00 |
| A6 = | −2.1125E+00 | −6.2036E+00 | −1.6579E+00 | 2.4575E+00 |
| A8 = | −3.5610E+00 | 1.6640E+02 | −6.6248E+01 | −2.8901E+01 |
| A10 = | 1.7382E+02 | −2.2725E+03 | 4.4327E+02 | 8.9825E+01 |
| A12 = | −1.1847E+03 | 1.3465E+04 | −9.2706E+02 | −1.2130E+02 |
| A14 = | 2.0578E+03 | −2.8814E+04 | | |

| Surface # | 6 | 7 | 8 | 9 |
|---|---|---|---|---|
| k = | 7.1944E+01 | −4.3334E+00 | −9.0000E+01 | −6.3646E+00 |
| A4 = | −1.1629E−01 | −3.3551E+00 | 1.2355E+00 | −2.8904E−01 |
| A6 = | 1.7321E+01 | 3.6627E+01 | −1.0583E+01 | −3.3738E−01 |
| A8 = | −1.5295E+02 | −2.5807E+02 | 3.8148E+01 | 1.4180E+00 |
| A10 = | 8.0774E+02 | 1.1045E+03 | −8.0171E+01 | −2.2858E+00 |
| A12 = | −2.6703E+03 | −2.4649E+03 | 1.0047E+02 | 1.8881E+00 |
| A14 = | 4.9597E+03 | 2.6595E+03 | −6.7446E+01 | −7.8767E−01 |
| A16 = | −3.9400E+03 | −1.0944E+03 | 1.8094E+01 | 1.5091E−01 |

In the imaging lens assembly according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| | | | |
|---|---|---|---|
| f [mm] | 1.49 | (T12 + T23 + T34)/Td | 0.16 |
| Fno | 2.04 | R4/|R3| | 0.43 |
| HFOV [deg.] | 40.0 | R4/R5 | 0.01 |
| V4/V2 | 2.40 | (R5 + R6)/(R5 − R6) | 0.99 |
| T12/CT2 | 0.49 | R8/|R7| | 0.0032 |
| (T23 + T34)/T12 | 0.94 | |f1/f2| | 0.86 |
| Sag22/T23 | −0.07 | |f3/f4| | 0.89 |
| R6/CT3 | −0.53 | f/f3 + |f/f4| | 5.32 |

3rd Embodiment

Figure 5:
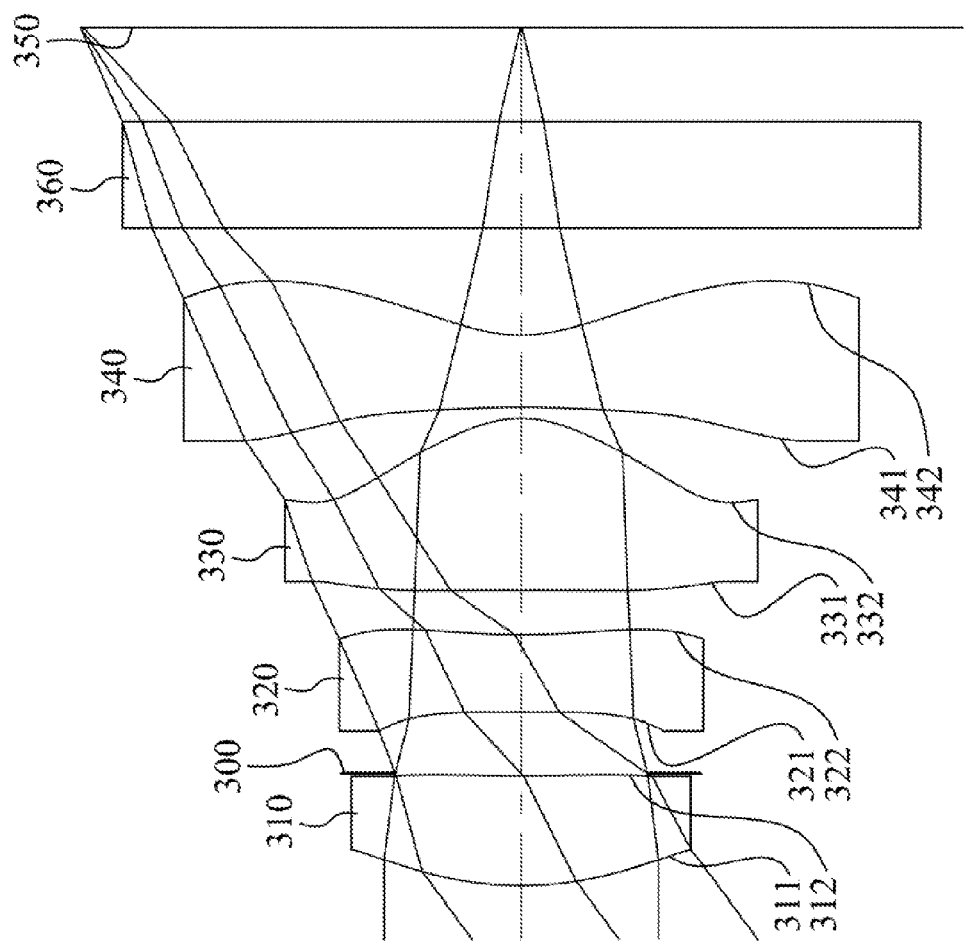
FIG. 5 is a schematic view of an imaging lens assembly according to the 3rd embodiment of the present disclosure.
Figure 6:
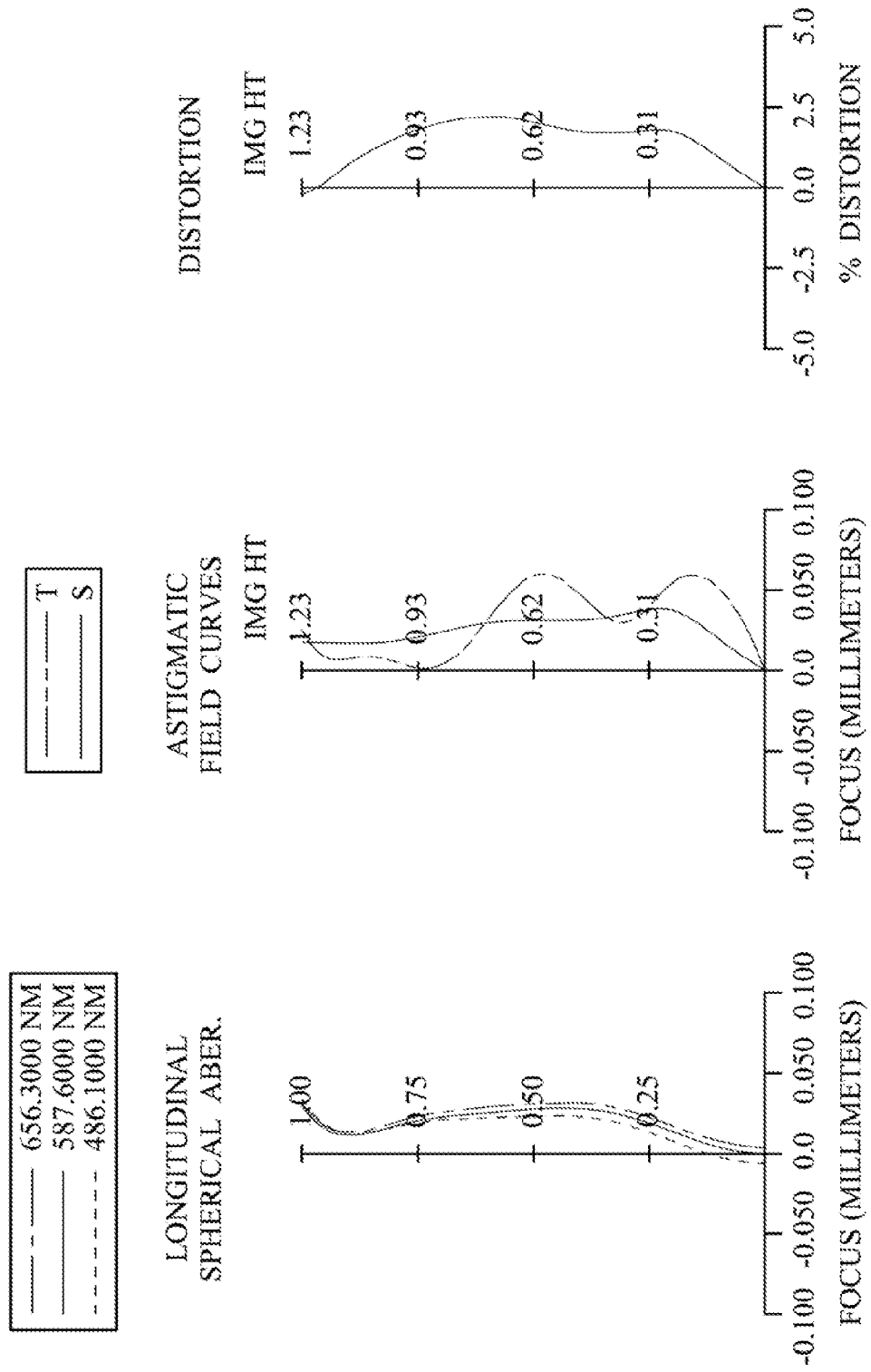
FIG. 6 shows spherical aberration curves, astigmatic field curves and a distortion curve of the imaging lens assembly according to the 3rd embodiment.

FIG. 5 is a schematic view of an imaging lens assembly according to the 3rd embodiment of the present disclosure. FIG. 6 shows spherical aberration curves, astigmatic field curves and a distortion curve of the imaging lens assembly according to the 3rd embodiment. In FIG. 5, the imaging lens assembly includes, in order from an object side to an image side, a first lens element 310, an aperture stop 300, a second lens element 320, a third lens element 330, a fourth lens element 340, an IR-cut filter 360 and an image plane 350. The imaging lens assembly has a total of four lens elements with refractive power.

The first lens element 310 is made of glass material. The first lens element 310 with positive refractive power has a convex object-side surface 311 at a paraxial region thereof and a concave image-side surface 312 at a paraxial is region thereof, wherein the image-side surface 312 of the first lens element 310 has a convex shape at a peripheral region thereof. The object-side surface 311 and the image-side surface 312 of the first lens element 310 are aspheric.

The second lens element 320 is made of plastic material. The second lens element 320 with negative refractive power has a convex object-side surface 321 at a paraxial region thereof and a concave image-side surface 322 at a paraxial region thereof, wherein the image-side surface 322 of the second lens element 320 has a convex shape at a peripheral region thereof. The object-side surface 321 and the image-side surface 322 of the second lens element 320 are aspheric.

The third lens element 330 is made of plastic material. The third lens element 330 with positive refractive power has a convex object-side surface 331 at a paraxial region thereof and a convex image-side surface 332 at a paraxial region thereof, wherein the image-side surface 332 of the third lens element 330 has a concave shape at a peripheral region thereof. The object-side surface to 331 and the image-side surface 332 of the third lens element 330 are aspheric.

The fourth lens element 340 is made of plastic material. The fourth lens element 340 with negative refractive power has a concave object-side surface 341 at a paraxial region thereof and a concave image-side surface 342 at a paraxial region thereof, wherein the image-side surface 342 of the fourth lens element 340 has a convex shape at a peripheral region thereof. The object-side surface 341 and the image-side surface 342 of the fourth lens element 340 are aspheric.

The IR-cut filter 360 is made of glass and located between the fourth lens element 340 and the image plane 350, and will not affect the focal length of the imaging lens assembly.

The detailed optical data of the 3rd embodiment are shown in Table 5 and the aspheric surface data are shown in Table 6 below.

TABLE 5

3rd Embodiment
f = 1.65 mm, Fno = 2.15, HFOV = 36.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 0.995 | ASP | 0.309 | Glass | 1.542 | 62.9 | 2.24 |
| 2 | | 4.928 | ASP | 0.007 | | | | |
| 3 | Ape. Stop | Plano | | 0.170 | | | | |
| 4 | Lens 2 | 32.000 | ASP | 0.219 | Plastic | 1.650 | 21.4 | −3.17 |
| 5 | | 1.932 | ASP | 0.123 | | | | |
| 6 | Lens 3 | 73.463 | ASP | 0.484 | Plastic | 1.535 | 55.7 | 0.56 |
| 7 | | −0.298 | ASP | 0.031 | | | | |
| 8 | Lens 4 | −2.345 | ASP | 0.200 | Plastic | 1.535 | 55.7 | −0.58 |
| 9 | | 0.371 | ASP | 0.300 | | | | |
| 10 | IR-cut filter | Plano | | 0.300 | Glass | 1.517 | 64.2 | — |
| 11 | | Plano | | 0.264 | | | | |
| 12 | Image | Plano | | — | | | | |

Note:
Reference wavelength (d-line) is 587.6 nm.

TABLE 6

Aspheric Coefficients

| | Surface # | | | |
|---|---|---|---|---|
| | 1 | 2 | 4 | 5 |
| k = | 3.7320E−01 | 4.4239E+01 | −9.0000E+01 | 3.0991E+00 |
| A4 = | −6.2222E−02 | −6.8262E−01 | −2.0160E+00 | −1.5502E+00 |
| A6 = | −1.4826E−01 | −5.8744E+00 | 5.8083E+00 | 7.0220E+00 |
| A8 = | −2.2748E+01 | 1.5494E+02 | −1.0796E+02 | −5.1092E+01 |
| A10 = | 2.1886E+02 | −2.1403E+03 | 5.8387E+02 | 1.5020E+02 |
| A12 = | −9.4419E+02 | 1.2652E+04 | −1.0145E+03 | −1.6013E+02 |
| A14 = | 1.3137E+03 | −2.7264E+04 | | |

| | Surface # | | | |
|---|---|---|---|---|
| | 6 | 7 | 8 | 9 |
| k = | 9.0000E+01 | −4.5638E+00 | −9.0000E+01 | −7.0432E+00 |
| A4 = | −1.0350E+00 | −3.1737E+00 | 1.1137E+00 | −3.1834E−01 |
| A6 = | 1.9075E+01 | 3.3212E+01 | −1.0882E+01 | −3.6954E−01 |
| A8 = | −1.5154E+02 | −2.1775E+02 | 3.9393E+01 | 1.4151E+00 |
| A10 = | 8.0120E+02 | 8.7601E+02 | −8.0183E+01 | −1.5206E+00 |
| A12 = | −2.6702E+03 | −1.8863E+03 | 9.9149E+01 | −2.8499E−03 |
| A14 = | 4.9602E+03 | 2.0070E+03 | −6.7868E+01 | 9.5608E−01 |
| A16 = | −3.9405E+03 | −8.3375E+02 | 1.8964E+01 | −4.3035E−01 |

In the imaging lens assembly according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following relationships:

| f [mm] | 1.65 | (T12 + T23 + T34)/Td | 0.21 |
|---|---|---|---|
| Fno | 2.15 | R4/|R3| | 0.06 |
| HFOV [deg.] | 36.5 | R4/R5 | 0.03 |
| V4/V2 | 2.60 | (R5 + R6)/(R5 − R6) | 0.99 |
| T12/CT2 | 0.81 | R8/|R7| | 0.16 |
| (T23 + T34)/T12 | 0.87 | |f1/f2| | 0.70 |
| Sag22/T23 | −0.10 | |f3/f4| | 0.95 |
| R6/CT3 | −0.62 | f/f3 + |f/f4| | 5.80 |

4th Embodiment

Figure 7:
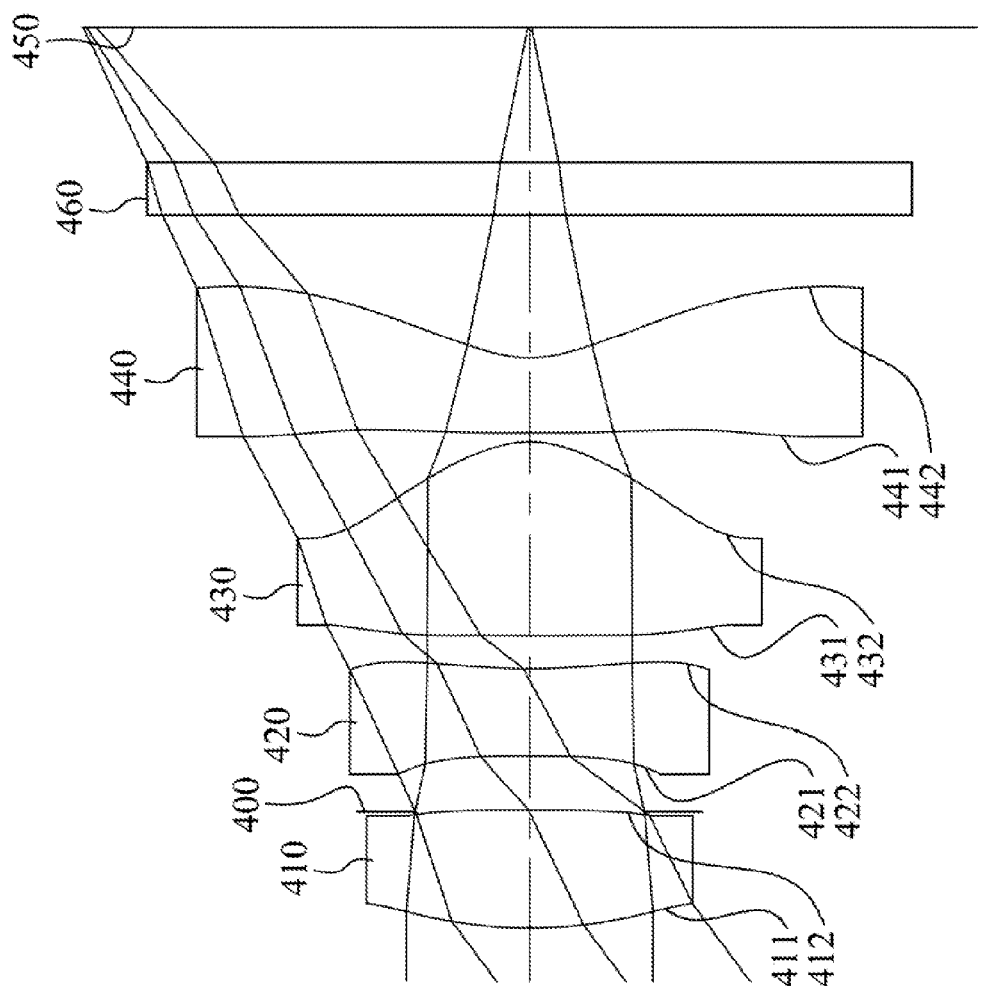
FIG. 7 is a schematic view of an imaging lens assembly according to the 4th embodiment of the present disclosure.
Figure 8:
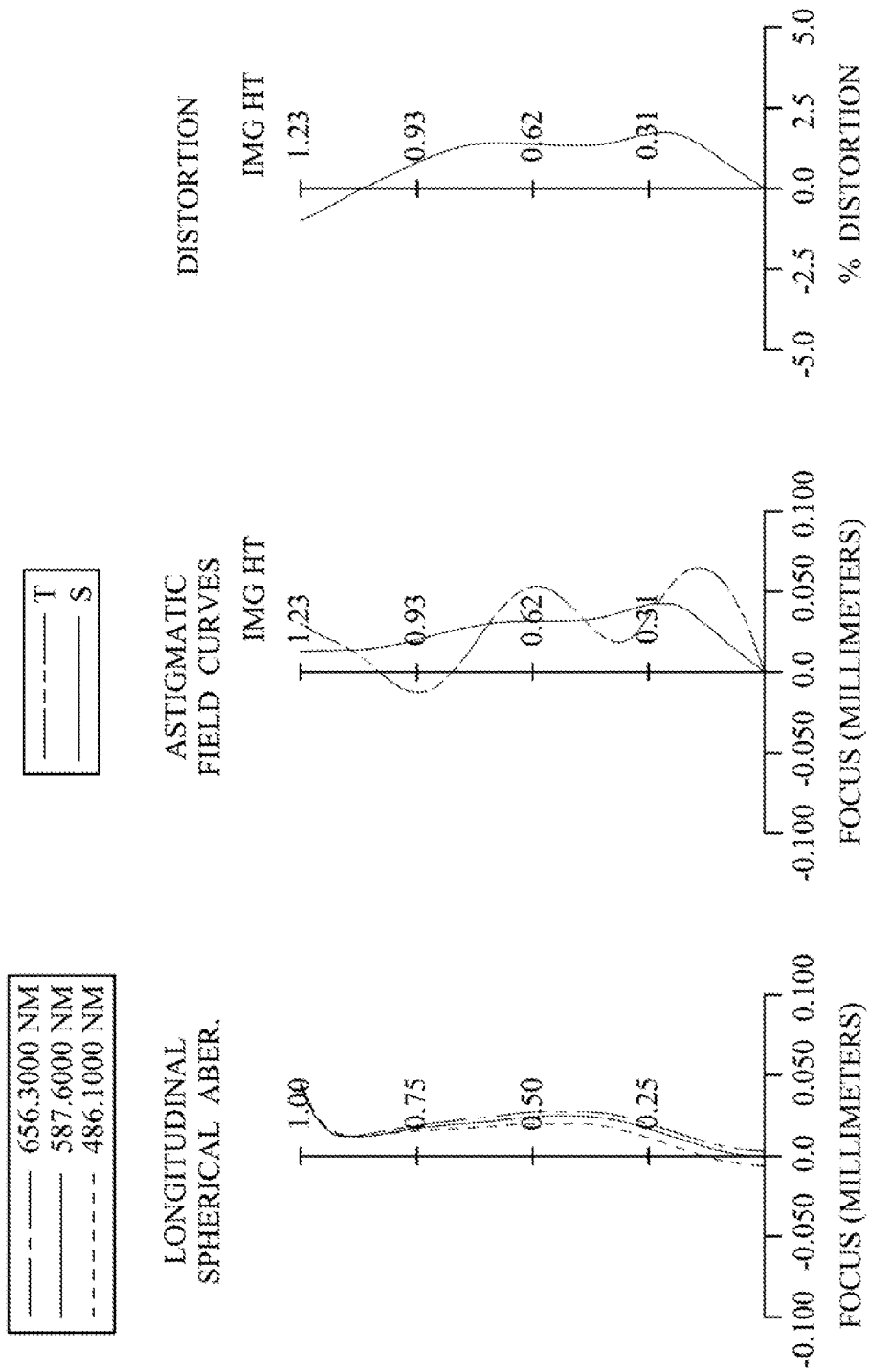
FIG. 8 shows spherical aberration curves, astigmatic field curves and a distortion curve of the imaging lens assembly according to the 4th embodiment.

FIG. 7 is a schematic view of an imaging lens assembly according to the 4th embodiment of the present disclosure. FIG. 8 shows spherical aberration curves, astigmatic field curves and a distortion curve of the imaging lens assembly according to the 4th embodiment. In FIG. 7, the imaging lens assembly includes, in order from an object side to an image side, a first lens element 410, an aperture stop 400, a second lens element 420, a third lens element 430, a fourth lens element 440, an IR-cut filter 460 and an image plane 450. The imaging lens assembly has a total of four lens elements with refractive power.

The first lens element 410 is made of plastic material. The first lens element 410 with positive refractive power has a convex object-side surface 411 at a paraxial region thereof and a convex image-side surface 412 at a paraxial region thereof. The object-side surface 411 and the image-side surface 412 of the first lens element 410 are aspheric.

The second lens element 420 is made of plastic material. The second lens element 420 with negative refractive power has a concave object-side surface 421 at a paraxial region thereof and a concave image-side surface 422 at a paraxial region thereof, wherein the image-side surface 422 of the second lens element 420 has a convex shape at a peripheral region thereof. The object-side surface 421 and the image-side surface 422 of the second lens element 420 are aspheric.

The third lens element 430 is made of plastic material. The third lens element 430 with positive refractive power has a convex object-side surface 431 at a paraxial region thereof and a convex image-side surface 432 at a paraxial region thereof, wherein the image-side surface 432 of the third lens element 430 has a concave shape at a peripheral region thereof. The object-side surface 431 and the image-side surface 432 of the third lens element 430 are aspheric.

The fourth lens element 440 is made of plastic material. The fourth lens element 440 with negative refractive power has a convex object-side surface 441 at a paraxial region thereof and a concave image-side surface 442 at a paraxial region thereof, wherein the image-side surface 442 of the fourth lens element 440 has a convex shape at a peripheral region thereof. The object-side surface 441 and the image-side surface 442 of the fourth lens element 440 are aspheric.

The IR-cut filter 460 is made of glass and located between the fourth lens element 440 and the image plane 450, and will not affect the focal length of the imaging lens assembly.

The detailed optical data of the 4th embodiment are shown in Table 7 and the aspheric surface data are shown in Table 8 below.

TABLE 7

4th Embodiment
f = 1.66 mm, Fno = 2.42, HFOV = 36.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.258 | ASP | 0.328 | Plastic | 1.544 | 55.9 | 2.29 |
| 2 | | −99.804 | ASP | −0.003 | | | | |
| 3 | Ape. Stop | Plano | | 0.154 | | | | |
| 4 | Lens 2 | −7.621 | ASP | 0.244 | Plastic | 1.639 | 23.5 | −2.19 |
| 5 | | 1.739 | ASP | 0.092 | | | | |
| 6 | Lens 3 | 31.759 | ASP | 0.540 | Plastic | 1.514 | 56.8 | 0.55 |
| 7 | | −0.281 | ASP | 0.025 | | | | |
| 8 | Lens 4 | 100.000 | ASP | 0.207 | Plastic | 1.535 | 55.7 | −0.60 |
| 9 | | 0.321 | ASP | 0.400 | | | | |
| 10 | IR-cut filter | Plano | | 0.145 | Glass | 1.517 | 64.2 | — |
| 11 | | Plano | | 0.377 | | | | |
| 12 | Image | Plano | | — | | | | |

Note:
Reference wavelength (d-line) is 587.6 nm.

TABLE 8

Aspheric Coefficients

| | Surface # | | | |
|---|---|---|---|---|
| | 1 | 2 | 4 | 5 |
| k = | 4.0301E−01 | 2.5163E+01 | −5.9821E+01 | 1.5547E+00 |
| A4 = | −7.0344E−02 | −9.2651E−01 | −2.1904E+00 | −1.6327E+00 |
| A6 = | −1.6770E+00 | −5.0348E+00 | 1.9367E+00 | 8.5438E+00 |
| A8 = | −5.2307E+00 | 1.4966E+02 | −6.8804E+01 | −5.5980E+01 |
| A10 = | 1.4493E+02 | −2.1959E+03 | 4.5841E+02 | 1.4923E+02 |
| A12 = | −9.6311E+02 | 1.2901E+04 | −8.6928E+02 | −1.5564E+02 |
| A14 = | 1.8069E+03 | −2.3081E+04 | 6.9447E+01 | 1.2275E+00 |
| A16 = | 2.7664E−01 | −5.2249E+00 | 1.0443E+02 | 2.1239E+00 |

| | Surface # | | | |
|---|---|---|---|---|
| | 6 | 7 | 8 | 9 |
| k = | −8.7353E+01 | −4.2074E+00 | −2.1708E+01 | −5.8959E+00 |
| A4 = | −8.0518E−01 | −3.2816E+00 | 1.2834E+00 | −2.5496E−01 |
| A6 = | 1.8690E+01 | 3.3096E+01 | −1.0726E+01 | −4.4717E−01 |
| A8 = | −1.5263E+02 | −2.1797E+02 | 3.8650E+01 | 1.5722E+00 |
| A10 = | 8.0204E+02 | 8.7617E+02 | −8.0406E+01 | −1.7350E+00 |
| A12 = | −2.6711E+03 | −1.8855E+03 | 9.9841E+01 | 2.3239E−01 |
| A14 = | 4.9594E+03 | 2.0117E+03 | −6.7520E+01 | 8.9019E−01 |
| A16 = | −3.9330E+03 | −8.4133E+02 | 1.8831E+01 | −4.5768E−01 |

In the imaging lens assembly according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| f [mm] | 1.66 | (T12 + T23 + T34)/Td | 0.17 |
|---|---|---|---|
| Fno | 2.42 | R4/|R3| | 0.23 |
| HFOV [deg.] | 36.6 | R4/R5 | 0.05 |
| V4/V2 | 2.37 | (R5 + R6)/(R5 − R6) | 0.98 |
| T12/CT2 | 0.62 | R8/|R7| | 0.0032 |
| (T23 + T34)/T12 | 0.77 | |f1/f2| | 1.04 |
| Sag22/T23 | −0.04 | |f3/f4| | 0.91 |
| R6/CT3 | −0.52 | f/f3 + |f/f4| | 5.80 |

5th Embodiment

Figure 9:
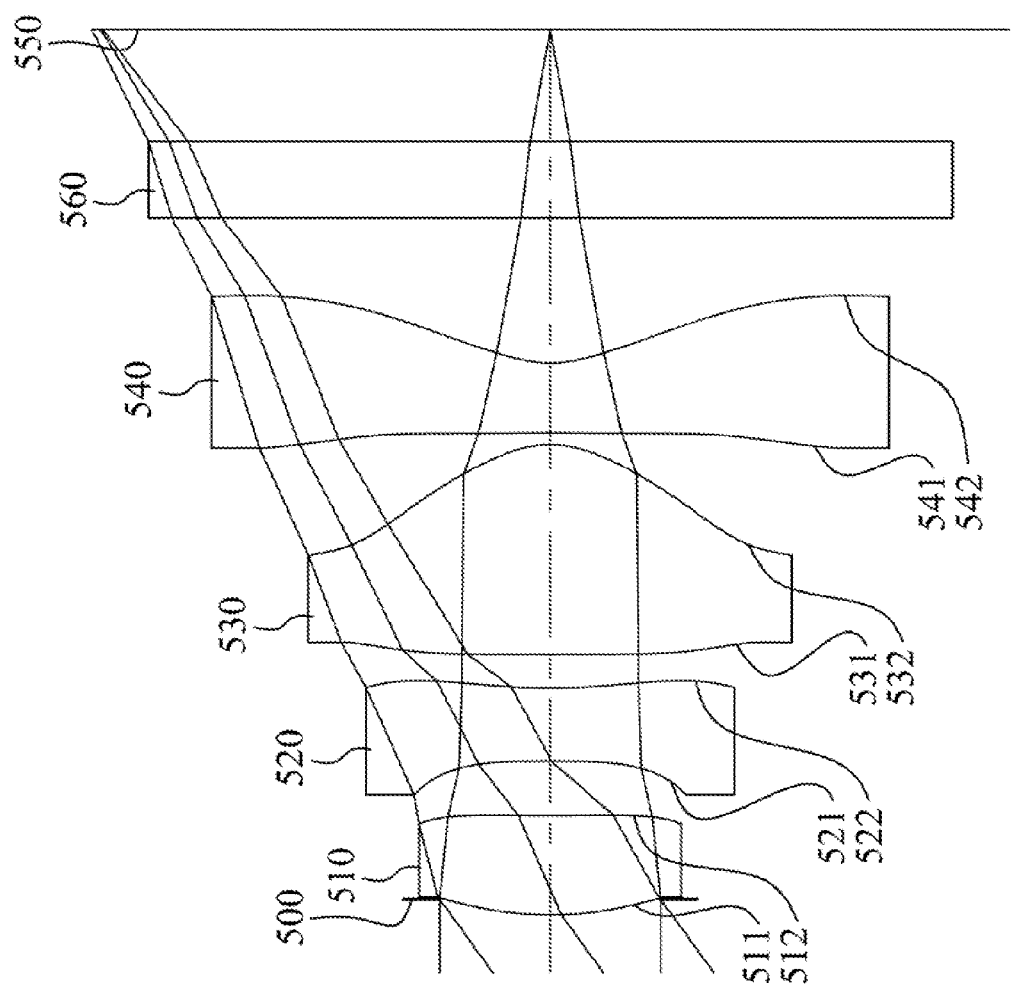
FIG. 9 is a schematic view of an imaging lens assembly according to the 5th embodiment of the present disclosure.
Figure 10:
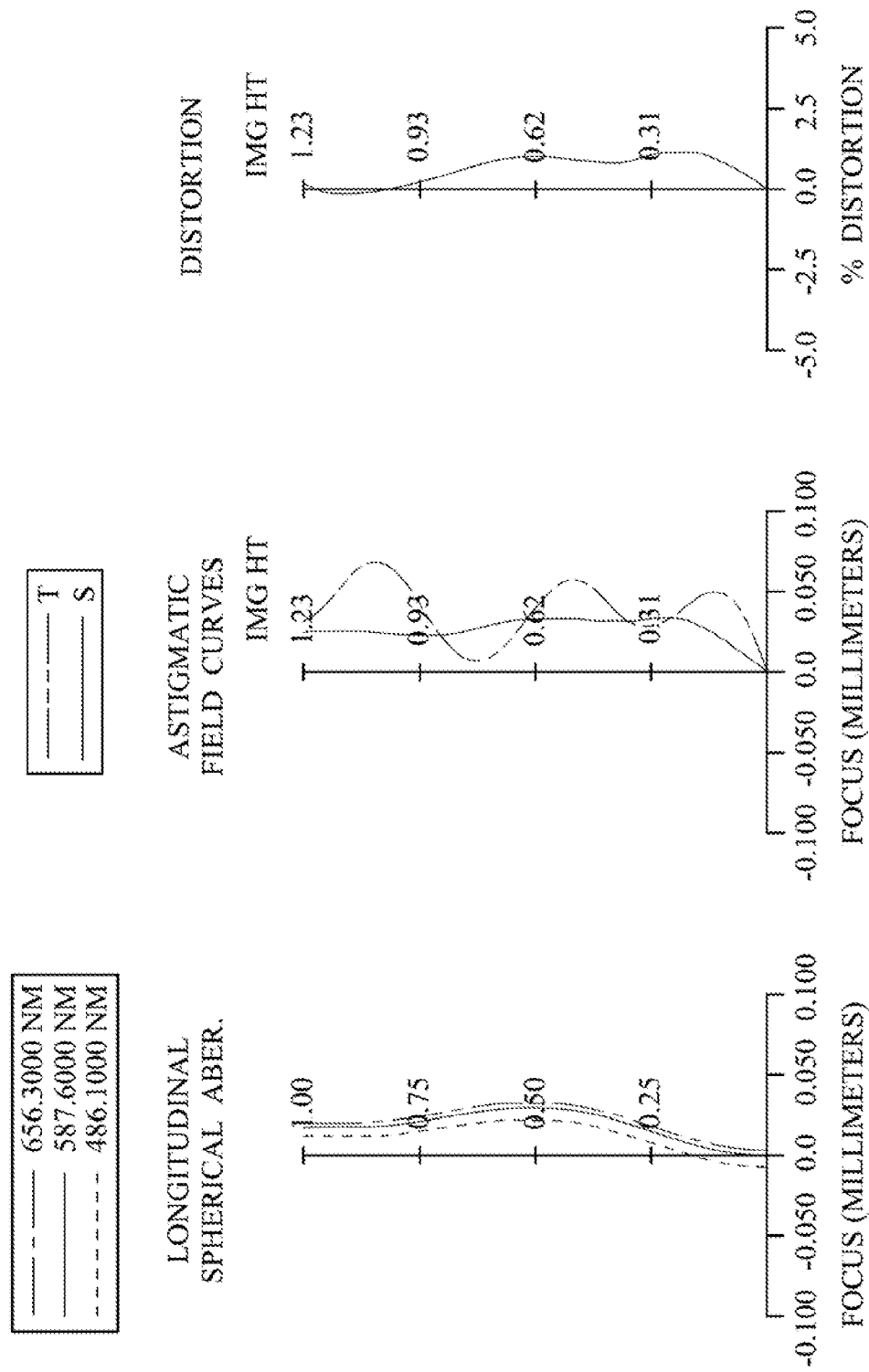
FIG. 10 shows spherical aberration curves, astigmatic field curves and a distortion curve of the imaging lens assembly according to the 5th embodiment.

FIG. 9 is a schematic view of an imaging lens assembly according to the 5th embodiment of the present disclosure. FIG. 10 shows spherical aberration curves, astigmatic field curves and a distortion curve of the imaging lens assembly according to the 5th embodiment. In FIG. 9, the imaging lens assembly includes, in order from an object side to an image side, an aperture stop 500, a first lens element 510, a second lens element 520, a third lens element 530, a fourth lens element 540, an IR-cut filter 560 and an image plane 550. The imaging lens assembly has a total of four lens elements with refractive power.

The first lens element 510 is made of plastic material. The first lens element 510 with positive refractive power has a convex object-side surface 511 at a paraxial region thereof and a concave image-side surface 512 at a paraxial region thereof, wherein the image-side surface 512 of the first lens element 510 has a convex shape at a peripheral region thereof. The object-side surface 511 and the image-side surface 512 of the first lens element 510 are aspheric.

The second lens element 520 is made of plastic material. The second lens element 520 with negative refractive power has a concave object-side surface 521 at a paraxial region thereof and a concave image-side surface 522 at a paraxial region thereof, wherein the image-side surface 522 of the second lens element 520 has a convex shape at a peripheral region thereof. The object-side surface 521 and the image-side surface 522 of the second lens element 520 are aspheric.

The third lens element 530 is made of plastic material. The third lens element 530 with positive refractive power has a convex object-side surface 531 at a paraxial region thereof and a convex image-side surface 532 at a paraxial region thereof, wherein the image-side surface 532 of the third lens element 530 has a concave shape at a peripheral region thereof. The object-side surface 531 and the image-side surface 532 of the third lens element 530 are aspheric.

The fourth lens element 540 is made of plastic material. The fourth lens element 540 with negative refractive power has a concave object-side surface 541 at a paraxial region thereof and a concave image-side surface 542 at a paraxial region thereof, wherein the image-side surface 542 of the fourth lens element 540 has a convex shape at a peripheral region thereof. The object-side surface 541 and the image-side surface 542 of the fourth lens element 540 are aspheric.

The IR-cut filter 560 is made of glass and located between the fourth lens element 540 and the image plane 550, and will not affect the focal length of the imaging lens assembly.

The detailed optical data of the 5th embodiment are shown in Table 9 and the aspheric surface data are shown in Table 10 below.

TABLE 9

5th Embodiment
f = 1.67 mm, Fno = 2.75, HFOV = 36.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.042 | | | | |
| 2 | Lens 1 | 0.969 | ASP | 0.274 | Plastic | 1.544 | 55.9 | 1.99 |
| 3 | | 8.258 | ASP | 0.150 | | | | |
| 4 | Lens 2 | −4.406 | ASP | 0.200 | Plastic | 1.583 | 30.2 | −1.90 |
| 5 | | 1.502 | ASP | 0.092 | | | | |
| 6 | Lens 3 | 25.486 | ASP | 0.577 | Plastic | 1.514 | 56.8 | 0.51 |
| 7 | | −0.263 | ASP | 0.032 | | | | |
| 8 | Len 4 | −6.419 | ASP | 0.190 | Plastic | 1.535 | 46.3 | −0.54 |
| 9 | | 0.306 | ASP | 0.400 | | | | |
| 10 | IR-cut filter | Plano | | 0.210 | Glass | 1.517 | 64.2 | — |
| 11 | | Plano | | 0.308 | | | | |
| 12 | Image | Plano | | — | | | | |

Note:
Reference wavelength (d-line) is 587.6 nm.

TABLE 10

Aspheric Coefficients

| | Surface # | | | |
|---|---|---|---|---|
| | 2 | 3 | 4 | 5 |
| k = | 8.9794E−01 | 9.0000E+01 | 1.8656E+01 | −1.9714E+00 |
| A4 = | −7.9472E−02 | −8.8112E−01 | −3.0379E+00 | −1.7569E+00 |

TABLE 10-continued

| Aspheric Coefficients | | | |
|---|---|---|---|
| A6 = | −3.4754E+00 | −1.1661E+01 | −3.8737E−01 | 8.2779E+00 |
| A8 = | 2.2801E+01 | 1.6538E+02 | −8.6535E+01 | −5.3567E+01 |
| A10 = | −7.9308E+01 | −1.8771E+03 | 4.4326E+02 | 1.5336E+02 |
| A12 = | −8.9688E+02 | 8.3787E+03 | −9.5912E+02 | −1.5686E+02 |
| A14 = | 2.1219E+03 | −1.4511E+04 | | |

| | Surface # | | | |
|---|---|---|---|---|
| | 6 | 7 | 8 | 9 |
| k = | 9.0000E+01 | −3.9805E+00 | −4.4245E+01 | −6.4295E+00 |
| A4 = | −6.3158E−01 | −3.3084E+00 | 1.3681E+00 | −2.8273E−01 |
| A6 = | 1.8008E+01 | 3.2875E+01 | −1.0845E+01 | −3.8646E−01 |
| A8 = | −1.5296E+02 | −2.1797E+02 | 3.8704E+01 | 1.4872E+00 |
| A10 = | 8.0546E+02 | 8.7638E+02 | −8.0314E+01 | −1.6962E+00 |
| A12 = | −2.6643E+03 | −1.8854E+03 | 9.9834E+01 | 2.8171E−01 |
| A14 = | 4.9473E+03 | 2.0117E+03 | −6.7576E+01 | 9.0364E−01 |
| A16 = | −3.9674E+03 | −8.4280E+02 | 1.8638E+01 | −5.0151E−01 |

In the imaging lens assembly according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| f [mm] | 1.67 | (T12 + T23 + T34)/Td | 0.18 |
|---|---|---|---|
| Fno | 2.75 | R4/|R3| | 0.34 |
| HFOV [deg.] | 36.2 | R4/R5 | 0.06 |
| V4/V2 | 1.53 | (R5 + R6)/(R5 − R6) | 0.98 |
| T12/CT2 | 0.75 | R8/|R7| | 0.05 |
| (T23 + T34)/T12 | 0.83 | |f1/f2| | 1.05 |
| Sag22/T23 | 0.01 | |f3/f4| | 0.95 |
| R6/CT3 | −0.46 | f/f3 + |f/f4| | 6.34 |

6th Embodiment

Figure 11:
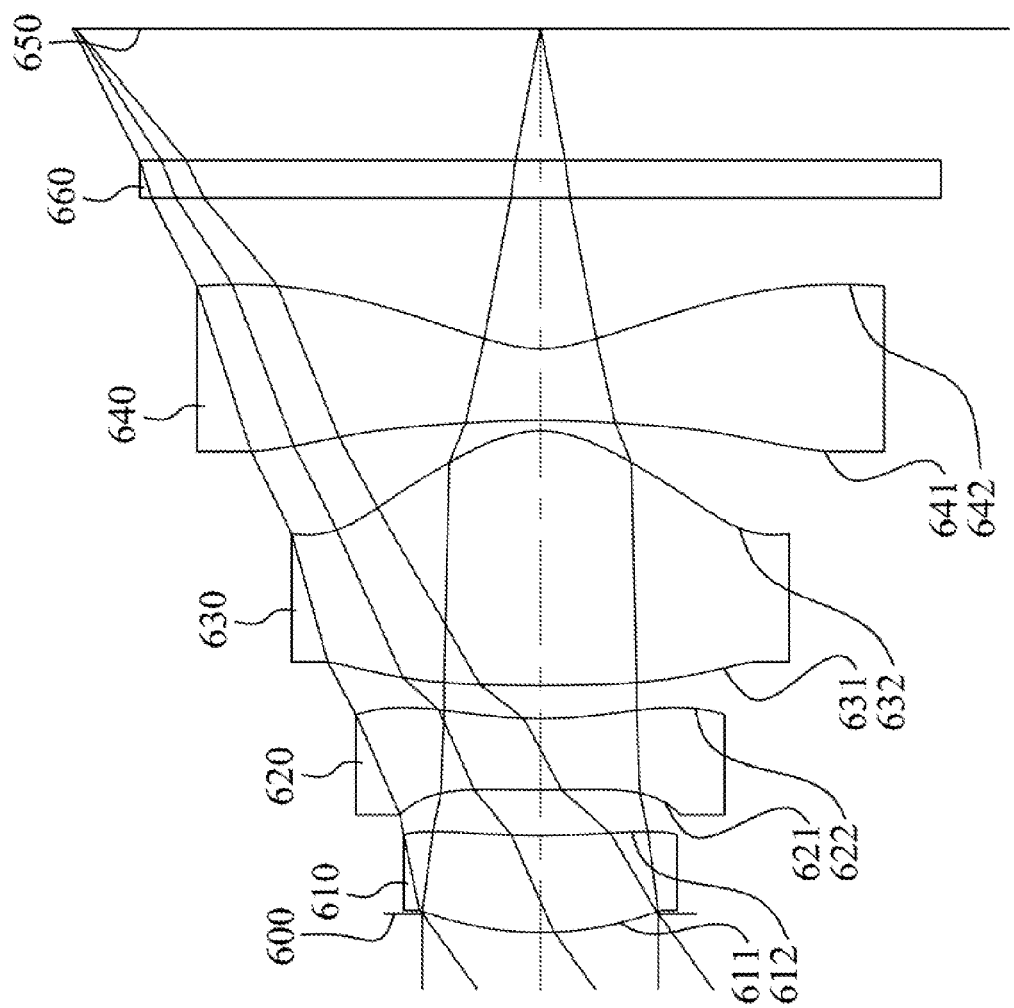
FIG. 11 is a schematic view of an imaging lens assembly according to the 6th embodiment of the present disclosure.
Figure 12:
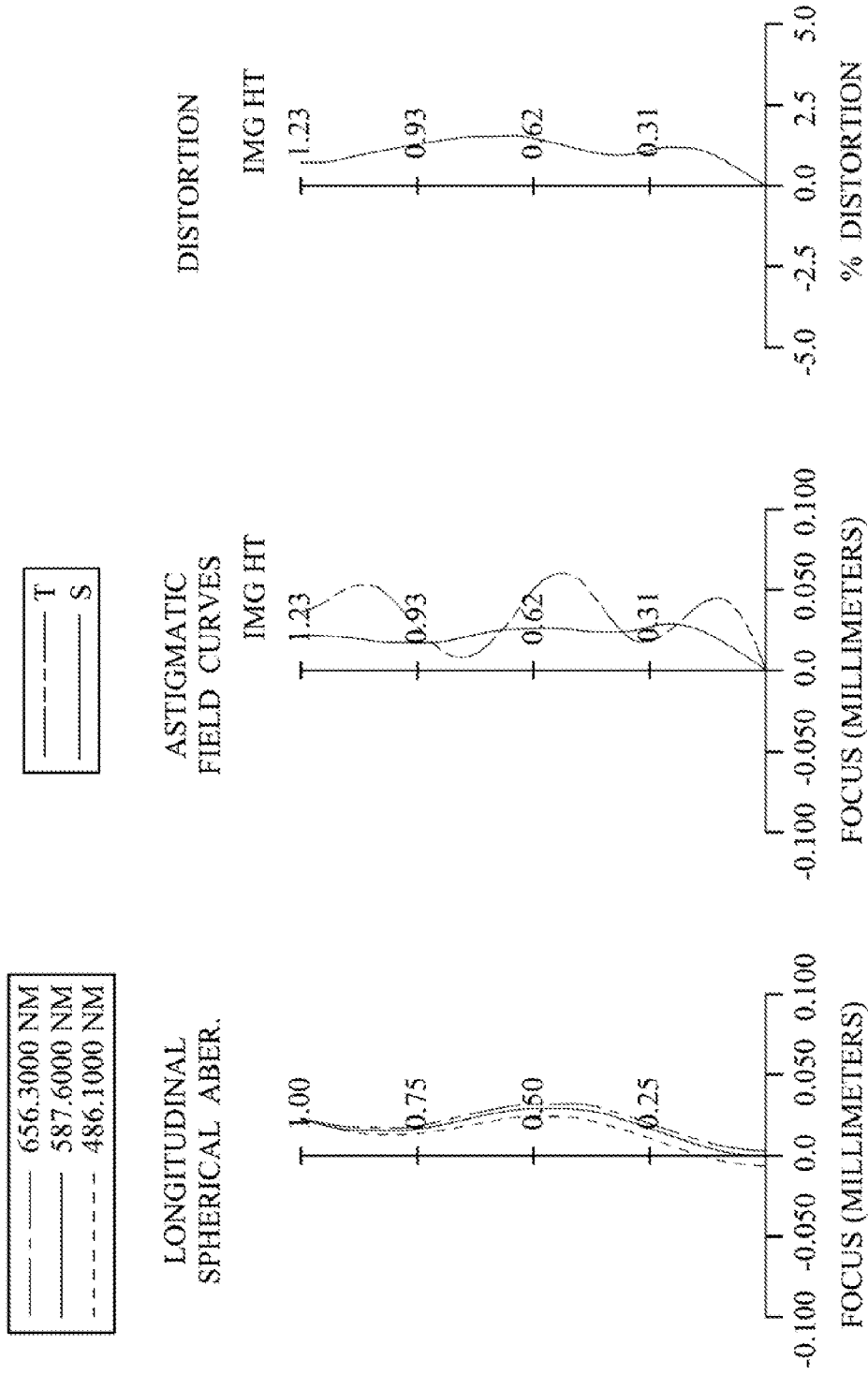
FIG. 12 shows spherical aberration curves, astigmatic field curves and a distortion curve of the imaging lens assembly according to the 6th embodiment.

FIG. 11 is a schematic view of an imaging lens assembly according to the 6th embodiment of the present disclosure. FIG. 12 shows spherical aberration curves, astigmatic field curves and a distortion curve of the imaging lens assembly according to the 6th embodiment. In FIG. 11 the imaging lens assembly includes, in order from an object side to an image side, an aperture stop 600, a first lens element 610, a second lens element 620, a third lens element 630, a fourth lens element 640, an IR-cut filter 660 and an image plane 650. The imaging lens assembly has a total of four lens elements with refractive power.

The first lens element 10 is made of plastic material. The first lens element 610 with positive refractive power has a convex object-side surface 611 at a paraxial region thereof and a concave image-side surface 612 at a paraxial region thereof, wherein the image-side surface 612 of the first lens element 610 has a convex shape at a peripheral region thereof. The object-side surface 611 and the image-side surface 612 of the first lens element 610 are aspheric.

The second lens element 620 is made of plastic material. The second lens element 620 with negative refractive power has a convex object-side surface 621 at a paraxial region thereof and a concave image-side surface 622 at a paraxial region thereof, wherein the image-side surface 622 of the second lens element 620 has a convex shape at a peripheral region thereof. The object-side surface 621 and the image-side surface 622 of the second lens element 620 are aspheric.

The third lens element 630 is made of plastic material. The third lens element 630 with positive refractive power has a convex object-side surface 631 at a paraxial region thereof and a convex image-side surface 632 at a paraxial region thereof, wherein the image-side surface 632 of the third lens element 630 has a concave shape at a peripheral region thereof. The object-side surface 631 and the image-side surface 632 of the third lens element 630 are aspheric.

The fourth lens element 640 is made of plastic material. The fourth lens element 640 with negative refractive power has a concave object-side surface 641 at a paraxial region thereof and a concave image-side surface 642 at a paraxial region thereof, wherein the image-side surface 642 of the fourth lens element 640 has a convex shape at a peripheral region thereof. The object-side surface 641 and the image-side surface 642 of the fourth lens element 640 are aspheric.

The IR-cut filter 660 is made of plastic and located between the fourth lens element 640 and the image plane 650, and will not affect the focal length of the imaging lens assembly.

The detailed optical data of the 6th embodiment are shown in Table 11 and the aspheric surface data are shown in Table 12 below.

TABLE 11

6th Embodiment
f = 1.66 mm, Fno = 2.65, HFOV = 36.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.050 | | | | |
| 2 | Lens 1 | 0.890 ASP | 0.259 | Plastic | 1.544 | 55.9 | 2.58 |
| 3 | | 2.180 ASP | 0.121 | | | | |

TABLE 11-continued

6th Embodiment
f = 1.66 mm, Fno = 2.65, HFOV = 36.1 deg.

| Surface # | | Curvature Radius | Thickness | Material | Index | Abbe # | Focal Length |
|---|---|---|---|---|---|---|---|
| 4 | Lens 2 | 3.723 | ASP | 0.190 | Plastic | 1.608 | 25.7 | -2.65 |
| 5 | | 1.103 | ASP | 0.088 | | | | |
| 6 | Lens 3 | 4.546 | ASP | 0.677 | Plastic | 1.525 | 56.4 | 0.49 |
| 7 | | -0.256 | ASP | 0.028 | | | | |
| 8 | Lens 4 | -1.935 | ASP | 0.190 | Plastic | 1.558 | 46.2 | -0.48 |
| 9 | | 0.325 | ASP | 0.400 | | | | |
| 10 | IR-cut filter | Plano | | 0.100 | Plastic | 1.491 | 52.6 | — |
| 11 | | Plano | | 0.351 | | | | |
| 12 | Image | Plano | | — | | | | |

Note:
Reference wavelength (d-line) is 587.6 nm.

TABLE 12

Aspheric Coefficients

| | Surface # | | | |
|---|---|---|---|---|
| | 2 | 3 | 4 | 5 |
| k = | 1.4413E+00 | 9.6889E+00 | 2.0844E+01 | -2.4452E+00 |
| A4 = | -1.5476E-01 | -9.0463E-01 | -3.3242E+00 | -1.9652E+00 |
| A6 = | -1.2559E+00 | -1.1995E+01 | -1.0345E+00 | 6.9131E+00 |
| A8 = | 1.1844E+00 | 1.8869E+02 | -8.8534E+01 | -5.1365E+01 |
| A10 = | 6.6826E+01 | -1.9564E+03 | 4.2888E+02 | 1.5861E+02 |
| A12 = | -8.9688E+02 | 8.3787E+03 | -9.5912E+02 | -1.5686E+02 |
| A14 = | 2.1219E+03 | -1.4511E+04 | | |

| | Surface # | | | |
|---|---|---|---|---|
| | 6 | 7 | 8 | 9 |
| k = | 1.5543E+01 | -3.9581E+00 | -5.5763E+01 | -7.4647E+00 |
| A4 = | -5.5627E-01 | -3.1022E+00 | 1.1786E+00 | -2.6943E-01 |
| A6 = | 1.7635E+01 | 3.2599E+01 | -1.0547E+01 | -3.4466E-01 |
| A8 = | -1.5371E+02 | -2.1799E+02 | 3.8772E+01 | 1.4164E+00 |
| A10 = | 8.0721E+02 | 8.7700E+02 | -8.0404E+01 | -1.6777E+00 |
| A12 = | -2.6626E+03 | -1.8841E+03 | 9.9742E+01 | 2.9913E-01 |
| A14 = | 4.9537E+03 | 2.0125E+03 | -6.7603E+01 | 8.8774E-01 |
| A16 = | -3.9674E+03 | -8.4590E+02 | 1.8550E+01 | -4.9824E-01 |

In the imaging lens assembly according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| f [mm] | 1.66 | (T12 + T23 + T34)/Td | 0.15 |
| Fno | 2.65 | R4/|R3| | 0.30 |
| HFOV [deg.] | 36.1 | R4/R5 | 0.24 |
| V4/V2 | 1.80 | (R5 + R6)/(R5 − R6) | 0.89 |
| T12/CT2 | 0.64 | R8/|R7| | 0.17 |
| (T23 + T34)/T12 | 0.96 | |f1/f2| | 0.97 |
| Sag22/T23 | 0.12 | |f3/f4| | 1.00 |
| R6/CT3 | -0.38 | f/f3 + |f/f4| | 6.86 |

7th Embodiment

Figure 13:
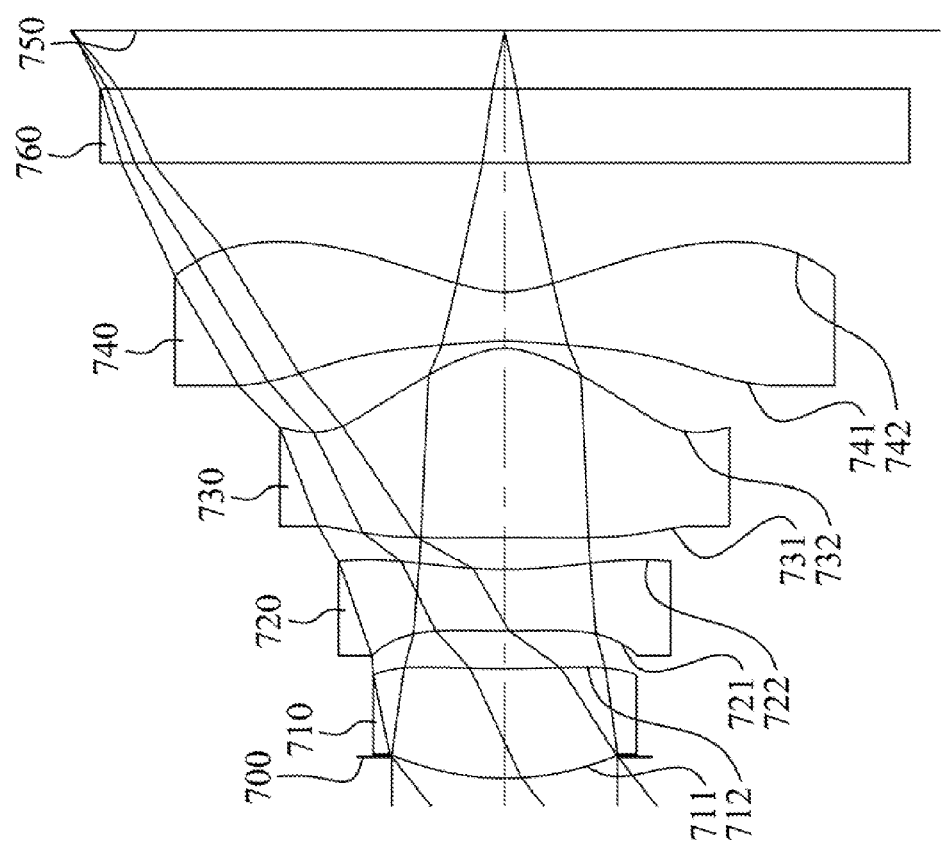
FIG. 13 is a schematic view of an imaging lens assembly according to the 7th embodiment of the present disclosure.
Figure 14:
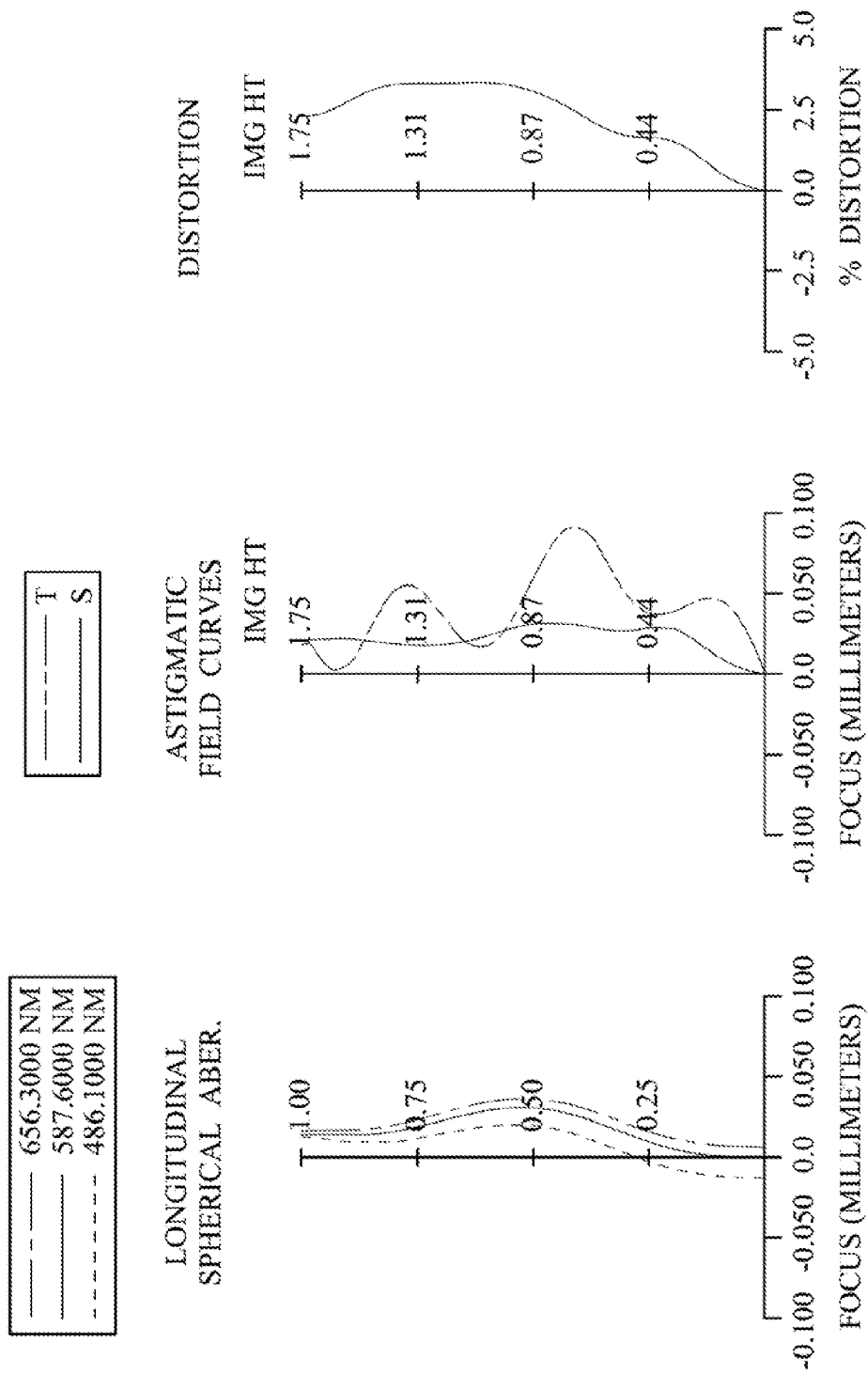
FIG. 14 shows spherical aberration curves, astigmatic field curves and a distortion curve of the imaging lens assembly according to the 7th embodiment.

FIG. 13 is a schematic view of an imaging lens assembly according to the 7th embodiment of the present disclosure. FIG. 14 shows spherical aberration curves, astigmatic field curves and a distortion curve of the imaging lens assembly according to the 7th embodiment. In FIG. 13, the imaging lens assembly includes, in order from an object side to an image side, an aperture stop 700, a first lens element 710, a second lens element 720, a third lens element 730, a fourth lens element 740, an IR-cut filter 760 and an image plane 750. The imaging lens assembly has a total of four lens elements with refractive power.

The first lens element 710 is made of glass material. The first lens element 710 with positive refractive power has a convex object-side surface 711 at a paraxial region thereof and a concave image-side surface 712 at a paraxial region thereof, wherein the image-side surface 712 of the first lens element 710 has a convex shape at a peripheral region thereof. The object-side surface 711 and the image-side surface 712 of the first lens element 710 are aspheric.

The second lens element 720 is made of plastic material. The second lens element 720 with negative refractive power has a convex object-side surface 721 at a paraxial region thereof and a concave image-side surface 722 at a paraxial region thereof, wherein the image-side surface 722 of the second lens element 720 has a convex shape at a peripheral region thereof. The object-side surface 721 and the image-side surface 722 of the second lens element 720 are aspheric.

The third lens element 730 is made of plastic material. The third lens element 730 with positive refractive power has a convex object-side surface 731 at a paraxial region thereof and a convex image-side surface 732 at a paraxial region thereof, wherein the image-side surface 732 of the third lens element 730 has a concave shape at a peripheral region thereof. The object-side surface 731 and the image-side surface 732 of the third lens element 730 are aspheric.

The fourth lens element 740 is made of plastic material. The fourth lens element 740 with negative refractive power has a concave object-side surface 741 at a paraxial region thereof and a concave image-side surface 742 at a paraxial region thereof, wherein the image-side surface 742 of the fourth lens element 740 has a convex shape at a peripheral region thereof. The object-side surface 741 and the image-side surface 742 of the fourth lens element 740 are aspheric.

The IR-cut filter 760 is made of glass and located between the fourth lens element 740 and the image plane 750, and will not affect the focal length of the imaging lens assembly.

The detailed optical data of the 7th embodiment are shown in Table 13 and the aspheric surface data are shown in Table 14 below.

TABLE 13

7th Embodiment
f = 2.14 mm, Fno = 2.35, HFOV = 38.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.087 | | | | |
| 2 | Lens 1 | 1.135 | ASP | 0.442 | Glass | 1.542 | 62.9 | 2.66 |
| 3 | | 4.571 | ASP | 0.153 | | | | |
| 4 | Lens 2 | 6.948 | ASP | 0.246 | Plastic | 1.608 | 25.7 | −4.26 |
| 5 | | 1.862 | ASP | 0.130 | | | | |
| 6 | Lens 3 | 162.567 | ASP | 0.762 | Plastic | 1.525 | 56.4 | 0.56 |
| 7 | | −0.296 | ASP | 0.030 | | | | |
| 8 | Lens 4 | −1.022 | ASP | 0.200 | Plastic | 1.514 | 56.8 | −0.55 |
| 9 | | 0.421 | ASP | 0.520 | | | | |
| 10 | IR-cut filter | Plano | | 0.300 | Glass | 1.517 | 64.2 | — |
| 11 | | Plano | | 0.236 | | | | |
| 12 | Image | Plano | | — | | | | |

Note:
Reference wavelength (d-line) is 587.6 nm.

TABLE 14

Aspheric Coefficients

| Surface # | | | | |
|---|---|---|---|---|
| | 2 | 3 | 4 | 5 |
| k = | −4.3997E−01 | 7.8507E+00 | 5.5834E+01 | 1.8311E+00 |
| A4 = | 5.4932E−02 | −2.6433E−01 | −1.1425E+00 | −6.0106E−01 |
| A6 = | −1.9976E−01 | −3.6816E+00 | 1.2005E+00 | 1.3068E+00 |
| A8 = | −3.4362E−01 | 2.9718E+01 | −2.1966E+01 | −7.0768E+00 |
| A10 = | 8.8857E+00 | −1.6982E+02 | 6.4281E+01 | 1.5583E+01 |
| A12 = | −5.0046E+01 | 4.5036E+02 | −5.9786E+01 | −1.2179E+01 |
| A14 = | 7.0058E+01 | −4.7910E+02 | | −1.3111E+00 |
| A16 = | | | | 5.9670E+00 |

| Surface # | | | | |
|---|---|---|---|---|
| | 6 | 7 | 8 | 9 |
| k = | −9.0000E+01 | −4.6805E+00 | −8.8226E+01 | −7.4344E+00 |
| A4 = | −3.4892E−01 | −1.4526E+00 | 3.9625E−01 | −1.4426E−01 |
| A6 = | 5.2208E+00 | 8.8591E+00 | −2.8441E+00 | −1.0076E−01 |
| A8 = | −2.4812E+01 | −3.4786E+01 | 6.3410E+00 | 2.1599E−01 |
| A10 = | 7.5759E+01 | 8.2698E+01 | −7.6217E+00 | −1.2626E−01 |
| A12 = | −1.4822E+02 | −1.0507E+02 | 5.5079E+00 | −6.8925E−04 |
| A14 = | 1.6424E+02 | 6.6490E+01 | −2.2436E+00 | 2.3261E−02 |
| A16 = | −7.8636E+01 | −1.6587E+01 | 3.9077E−01 | −5.7950E−03 |

In the imaging lens assembly according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following relationships:

| f [mm] | 2.14 | (T12 + T23 + T34)/Td | 0.16 |
|---|---|---|---|
| Fno | 2.35 | R4/|R3| | 0.27 |
| HFOV [deg.] | 38.4 | R4/R5 | 0.01 |
| V4/V2 | 2.21 | (R5 + R6)/(R5 − R6) | 1.00 |
| T12/CT2 | 0.63 | R8/|R7| | 0.41 |
| (T23 + T34)/T12 | 1.05 | |f1/f2| | 0.63 |
| Sag22/T23 | 0.26 | |f3/f4| | 1.01 |
| R6/CT3 | −0.39 | f/f3 + |f/f4| | 7.65 |

8th Embodiment

Figure 15:
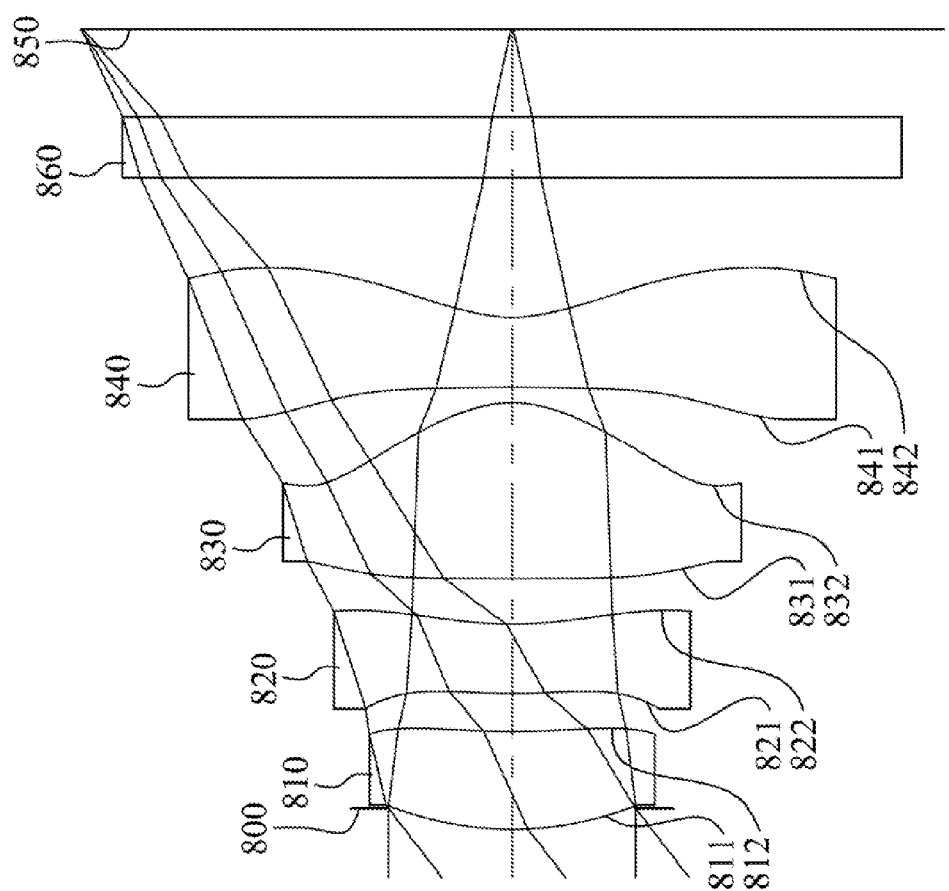
FIG. 15 is a schematic view of an imaging lens assembly according to the 8th embodiment of the present disclosure.
Figure 16:
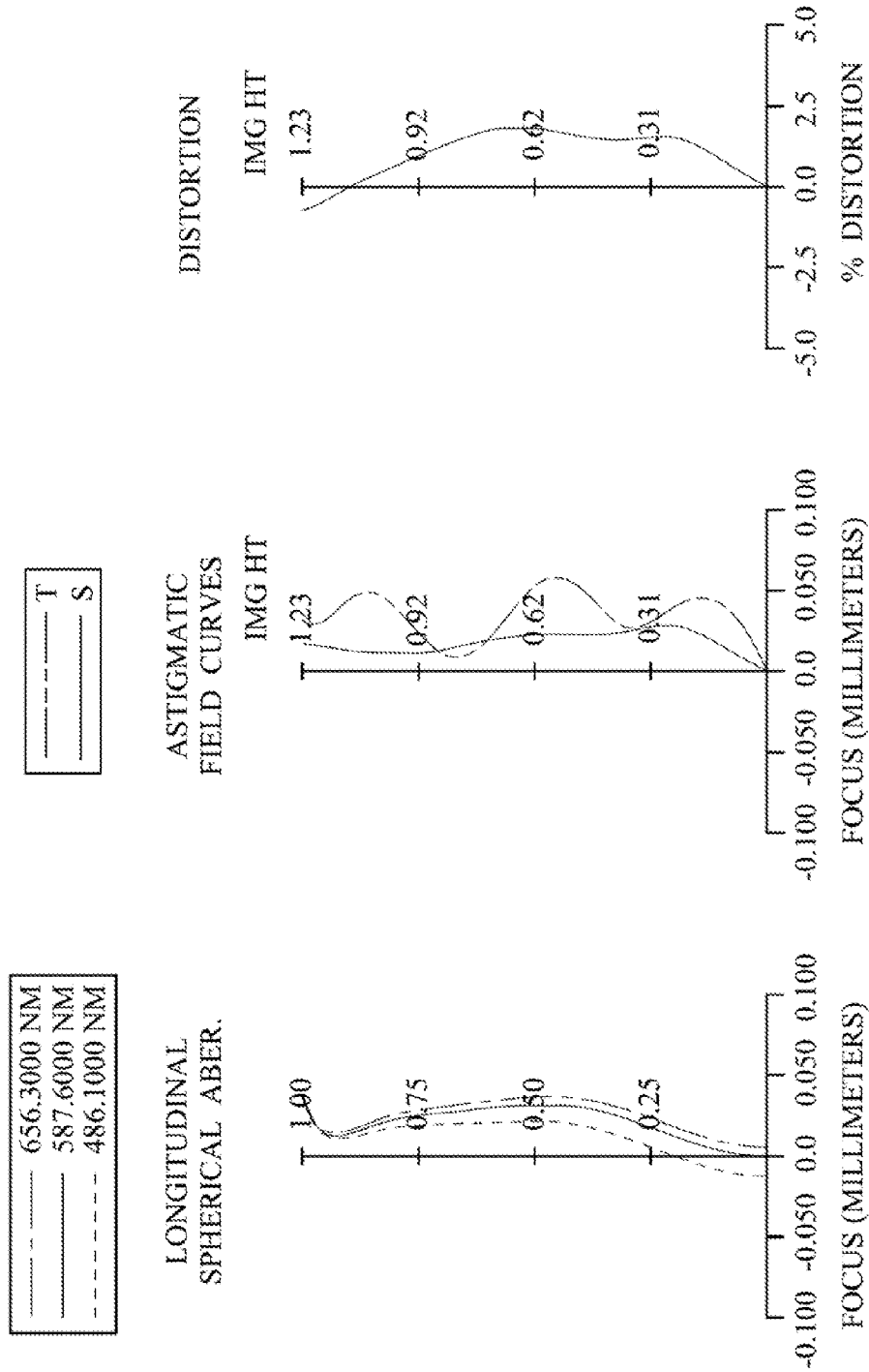
FIG. 16 shows spherical aberration curves, astigmatic field curves and a distortion curve of the imaging lens assembly according to the 8th embodiment.

FIG. 15 is a schematic view of an imaging lens assembly according to the 8th embodiment of the present disclosure. FIG. 16 shows spherical aberration curves, astigmatic field curves and a distortion curve of the imaging lens assembly according to the 8th embodiment. In FIG. 15, the imaging lens assembly includes, in order from an object side to an image side, an aperture stop 800, a first lens element 810, a second lens element 820, a third lens element 830, a fourth lens element 840, an IR-cut filter 860 and an image plane 850. The imaging lens assembly has a total of four lens elements with refractive power.

The first lens element 810 is made of plastic material. The first lens element 810 with positive refractive power has a convex object-side surface 811 at a paraxial region thereof and a concave image-side surface 812 at a paraxial region thereof, wherein the image-side surface 812 of the first lens element 810 has a convex shape at a peripheral region thereof. The object-side surface 811 and the image-side surface 812 of the first lens element 810 are aspheric.

The second lens element 820 is made of plastic material. The second lens element 820 with negative refractive power has a convex object-side surface 821 at a paraxial region thereof and a concave image-side surface 822 at a paraxial region thereof, wherein the image-side surface 822 of the second lens element 820 has a convex shape at a peripheral region thereof. The object-side surface 821 and the image-side surface 822 of the second lens element 820 are aspheric.

The third lens element 830 is made of plastic material. The third lens element 830 with positive refractive power has a convex object-side surface 831 at a paraxial region thereof and a convex image-side surface 832 at a paraxial region thereof, wherein the image-side surface 832 of the third lens element 830 has a concave shape at a peripheral region thereof. The object-side surface 831 and the image-side surface 832 of the third lens element 830 are aspheric.

The fourth lens element 840 is made of plastic material. The fourth lens element 840 with negative refractive power has a concave object-side surface 841 at a paraxial region thereof and a concave image-side surface 842 at a paraxial region thereof, wherein the image-side surface 842 of the fourth lens element 840 has a convex shape at a peripheral region thereof. The object-side surface 841 and the image-side surface 842 of the fourth lens element 840 are aspheric.

The IR-cut filter 860 is made of glass and located between the fourth lens element 840 and the image plane 850, and will not affect the focal length of the imaging lens assembly.

The detailed optical data of the 8th embodiment are shown in Table 15 and the aspheric surface data are shown in Table 16 below.

TABLE 15

8th Embodiment
f = 1.61 mm, Fno = 2.28, HFOV = 37.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.060 | | | | |
| 2 | Lens 1 | 0.932 | ASP | 0.280 | Plastic | 1.544 | 55.9 | 2.75 |
| 3 | | 2.204 | ASP | 0.108 | | | | |
| 4 | Lens 2 | 1.965 | ASP | 0.200 | Plastic | 1.639 | 23.5 | −4.62 |
| 5 | | 1.133 | ASP | 0.128 | | | | |
| 6 | Lens 3 | 23.156 | ASP | 0.506 | Plastic | 1.514 | 56.8 | 0.63 |
| 7 | | −0.328 | ASP | 0.044 | | | | |
| 8 | Lens 4 | −5.787 | ASP | 0.200 | Plastic | 1.535 | 55.7 | −0.71 |
| 9 | | 0.410 | ASP | 0.400 | | | | |
| 10 | IR-cut filter | Plano | | 0.175 | Glass | 1.517 | 64.2 | — |
| 11 | | Plano | | 0.251 | | | | |
| 12 | Image | Plano | | — | | | | |

Note:
Reference wavelength (d-line) is 587.6 nm.

TABLE 16

Aspheric Coefficients

| | Surface # | | | |
|---|---|---|---|---|
| | 2 | 3 | 4 | 5 |
| k = | 2.2491E−01 | −9.0000E+01 | −1.1827E+01 | −1.1652E+00 |
| A4 = | −1.5597E−01 | −1.3493E−01 | −2.4231E+00 | −1.4564E+00 |

TABLE 16-continued

| Aspheric Coefficients | | | | |
|---|---|---|---|---|
| A6 = | 1.0116E−01 | −1.7198E+01 | −1.1817E+00 | 3.5962E+00 |
| A8 = | −4.0046E+00 | 2.5236E+02 | −2.6506E+01 | −3.5568E+01 |
| A10 = | 9.0551E+00 | −2.6601E+03 | 5.5382E+01 | 1.7556E+02 |
| A12 = | −1.8636E+03 | 1.4747E+04 | 2.5221E+02 | −2.8002E+02 |
| A14 = | 2.7761E+04 | −3.4502E+04 | 7.8574E+03 | −2.6347E+02 |
| A16 = | −1.1216E+05 | 8.8851E+03 | −3.8210E+04 | 9.3110E+02 |

| | Surface # | | | |
|---|---|---|---|---|
| | 6 | 7 | 8 | 9 |
| k = | 9.0000E+01 | −4.7148E+00 | 3.3565E+01 | −6.7286E+00 |
| A4 = | −4.5659E−01 | −3.3303E+00 | 9.2147E−01 | −4.2857E−01 |
| A6 = | 1.5833E+01 | 3.3432E+01 | −1.0301E+01 | −2.0615E−01 |
| A8 = | −1.4347E+02 | −2.1800E+02 | 3.9040E+01 | 1.4115E+00 |
| A10 = | 8.0166E+02 | 8.7567E+02 | −8.0498E+01 | −1.6911E+00 |
| A12 = | −2.6938E+03 | −1.8849E+03 | 9.9490E+01 | 2.0971E−01 |
| A14 = | 4.9293E+03 | 2.0133E+03 | −6.7752E+01 | 8.5157E−01 |
| A16 = | −3.8117E+03 | −8.4543E+02 | 1.9097E+01 | −4.0528E−01 |

In the imaging lens assembly according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following relationships:

| | | | |
|---|---|---|---|
| f [mm] | 1.61 | (T12 + T23 + T34)/Td | 0.19 |
| Fno | 2.28 | R4/\|R3\| | 0.58 |
| HFOV [deg.] | 37.3 | R4/R5 | 0.05 |
| V4/V2 | 2.37 | (R5 + R6)/(R5 − R6) | 0.97 |
| T12/CT2 | 0.54 | R8/\|R7\| | 0.07 |
| (T23 + T34)/T12 | 1.59 | \|f1/f2\| | 0.60 |
| Sag22/T23 | 0.28 | \|f3/f4\| | 0.90 |
| R6/CT3 | −0.65 | f/f3 + \|f/f4\| | 4.82 |

It is to be noted that TABLES 1-16 show different data of the different embodiments; however, the data of the different embodiments are obtained from experiments. Therefore, any imaging lens system of the same structure is considered to be less than or equal to the scope of the present disclosure even if it uses different data. The embodiments depicted above and the appended drawings are exemplary and are not intended to limit the scope of the present disclosure.

What is claimed is:

1. An imaging lens assembly comprising, in order from an object side to an image side:
   a first lens element with positive refractive power having a convex object-side surface at a paraxial region thereof;
   a second lens element with negative refractive power having a concave image-side surface at a paraxial region thereof, wherein the image-side surface of the second lens element has a convex shape at a peripheral region thereof, and both of an object-side surface and the image-side surface of the second lens element are aspheric;
   a third lens element with positive refractive power having a convex object-side surface at a paraxial region thereof and a convex image-side surface at a paraxial region; and
   a fourth lens element with negative refractive power having a concave image-side surface at a paraxial region thereof, wherein the image-side surface of the fourth lens element has a convex shape at a peripheral region thereof, and both of an object-side surface and the image-side surface of the fourth lens element are aspheric;
   wherein the imaging lens assembly has a total of four lens elements with refractive power, an axial distance between the first lens element and the second lens element is T12, an axial distance between the second lens element and the third lens element is T23, an axial distance between the third lens element and the fourth lens element is T34, a curvature radius of the object-side surface of the second lens element is R3, a curvature radius of the image-side surface of the second lens element is R4, a focal length of the imaging lens assembly is f, a focal length of the third lens element is f3, a focal length of the fourth lens element is f4, and the following relationships are satisfied:

$0<(T23+T34)/T12<2.0;$ $0<R4/|R3|<0.9;$ and $4.0<f/f3+|f/f4|<9.0.$

2. The imaging lens assembly of claim 1, wherein the focal length of the imaging lens assembly is f, the focal length of the third lens element is f3, the focal length of the fourth lens element is f4, and the following relationship is satisfied:

$4.5<f/f3+|f1/f4|<8.5.$

3. The imaging lens assembly of claim 2, wherein the focal length of the imaging lens assembly is f, the focal length of the third lens element is f3, the focal length of the fourth lens element is f4, and the following relationship is satisfied:

$5.0<f/f3+|f/f4|<8.0.$

4. The imaging lens assembly of claim 2, wherein a curvature radius of the object-side surface of the third lens element is R5, a curvature radius of the image-side surface of the third lens element is R6, and the following relationship is satisfied:

$0.5<(R5+R6)/(R5-R6)\leq1.0.$

5. The imaging lens assembly of claim 2, wherein a curvature radius of the object-side surface of the fourth lens element is R7, a curvature radius of the image-side surface of the fourth lens element is R8, and the following relationship is satisfied:

$0\leq R8/|R7|<0.6.$

6. The imaging lens assembly of claim 1, wherein the axial distance between the first lens element and the second lens element is T12, the axial distance between the second lens element and the third lens element is T23, the axial distance between the third lens element and the fourth lens element is T34, and the following relationship is satisfied:

$0.5<(T23+T34)/T12<1.3$.

7. The imaging lens assembly of claim 6, wherein the curvature radius of the object-side surface of the second lens element is R3, the curvature radius of the image-side surface of the second lens element is R4, and the following relationship is satisfied:

$0<R4/|R3|<0.6$.

8. The imaging lens assembly of claim 1, wherein the focal length of the third lens element is f3, the focal length of the fourth lens element is f4, and the following relationship is satisfied:

$0.75<|f3/f4|<1.25$.

9. The imaging lens assembly of claim 8, wherein the image-side surface of the third lens element has a concave shape at a peripheral region thereof.

10. The imaging lens assembly of claim 8, wherein the curvature radius of the image-side surface of the second lens element is R4, a curvature radius of the object-side surface of the third lens element is R5, and the following relationship is satisfied:

$0<R4/R5$.

11. The imaging lens assembly of claim 1, wherein a focal length of the first lens element is f1, a focal length of the second lens element is f2, and the following relationship is satisfied:

$0.5<|f1/f2|<1.5$.

12. The imaging lens assembly of claim 11, wherein the axial distance between the first lens element and the second lens element is T12, a central thickness of the second lens element is CT2, and the following relationship is satisfied:

$0.30<T12/CT2<0.80$.

13. The imaging lens assembly of claim 11, wherein a distance in parallel with an optical axis from an axial vertex on the image-side surface of the second lens element to a maximum effective diameter position on the image-side surface of the second lens element is Sag22, the axial distance between the second lens element and the third lens element is T23, and the following relationship is satisfied:

$-1.0<Sag22/T23<0.2$.

14. The imaging lens assembly of claim 11, wherein a curvature radius of the image-side surface of the third lens element is R6, a central thickness of the third lens element is CT3, and the following relationship is satisfied:

$-0.85<R6/CT3<-0.25$.

15. The imaging lens assembly of claim 1, wherein an Abbe number of the second lens element is V2, an Abbe number of the fourth lens element is V4, and the following relationship is satisfied:

$1.5<V4/V2<3.0$.

16. The imaging lens assembly of claim 15, wherein the axial distance between the first lens element and the second lens element is T12, the axial distance between the second lens element and the third lens element is T23, the axial distance between the third lens element and the fourth lens element is T34, an axial distance between the object-side surface of the first lens element and the image-side surface of the fourth lens element is Td, and the following relationship is satisfied:

$0.10<(T12+T23+T34)/Td<0.22$.

17. The imaging lens assembly of claim 15, wherein the object-side surface of the fourth lens element is concave at a paraxial region thereof.

18. The imaging lens assembly of claim 1, wherein the first lens element has a concave image-side surface at a paraxial region thereof, and the image-side surface of the first lens element has a convex shape at a peripheral region thereof.

* * * * *

UNITED STATES PATENT AND TRADEMARK OFFICE
CERTIFICATE OF CORRECTION

PATENT NO. : 9,030,760 B2  
APPLICATION NO. : 13/849555  
DATED : May 12, 2015  
INVENTOR(S) : Lin-Yao Liao and Wei-Yu Chen Page 1 of 1

It is certified that error appears in the above-identified patent and that said Letters Patent is hereby corrected as shown below:

In the Claims (1) In column 28, line 49, claim 2 of the issued patent reads as "$4.5 < f/f3+|f1/f4| < 8.5$", but it should read as "$4.5 < f/f3+|f/f4| < 8.5$".

Signed and Sealed this  
Tenth Day of November, 2015

Michelle K. Lee  
*Director of the United States Patent and Trademark Office*